United States Patent
Sampath et al.

(10) Patent No.: US 8,095,166 B2
(45) Date of Patent: Jan. 10, 2012

(54) DIGITAL AND ANALOG POWER CONTROL FOR AN OFDMA/CDMA ACCESS TERMINAL

(75) Inventors: Hemanth Sampath, San Diego, CA (US); Dhananjay Ashok Gore, San Diego, CA (US); Edward Harrison Teague, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 656 days.

(21) Appl. No.: 12/055,264

(22) Filed: Mar. 25, 2008

(65) Prior Publication Data

US 2008/0242337 A1 Oct. 2, 2008

Related U.S. Application Data

(60) Provisional application No. 60/896,975, filed on Mar. 26, 2007.

(51) Int. Cl.
*H04B 7/00* (2006.01)
(52) U.S. Cl. ........................................ 455/522; 370/318
(58) Field of Classification Search .................... 455/69, 455/522; 370/318
See application file for complete search history.

(56) References Cited

U.S. PATENT DOCUMENTS

| 6,173,162 | B1 | 1/2001 | Dahlman et al. |
| 2003/0100269 | A1 | 5/2003 | Lehtinen et al. |
| 2003/0232622 | A1 | 12/2003 | Seo et al. |

FOREIGN PATENT DOCUMENTS

| EP | 1341318 | 9/2003 |
| EP | 1594267 | 11/2005 |
| RU | 2251220 | 4/2005 |
| RU | 2260913 | 9/2005 |
| RU | 2267863 | 1/2006 |

OTHER PUBLICATIONS

International Search Report—PCT/US08/058307—International Search Authority, European Patent Office—Jul. 17, 2008.
Written Opinion—PCT/US08/058307—International Search Authority, European Patent Office—Jul. 17, 2008.
3rd Generation Partnership Project: "3GPP TS 25.214 V5.0.0: Physical Layer Procedures (FDD)," 3GPP TS 25.214 V5.0.0, Mar. 1, 2002, pp. 1-56.

*Primary Examiner* — Raymond Dean
(74) *Attorney, Agent, or Firm* — Howard H. Seo

(57) ABSTRACT

Aspects describe controlling a power level for an access terminal in a wireless communication system that utilizes multiple modulation waveforms. The power can be controlled after an Access Grant is received in response to an Access Probe until the mobile device transitions into a steady state. A reference power can be continuously monitored and a setting of a power amplifier can be modified only when the reference power changes. A digital gain of a reverse data channel can be adjusted relative to the reference power level.

37 Claims, 10 Drawing Sheets

DIGITAL AND ANALOG POWER CONTROL FOR AN OFDMA/CDMA ACCESS TERMINAL

CROSS-REFERENCE

This application claims the benefit of U.S. Provisional Application Ser. No. 60/896,975, filed Mar. 26, 2007, entitled "DIGITAL AND ANALOG POWER CONTROL FOR AN OFDMA/CDMA ACCESS TERMINAL," and assigned to the assignee hereof and the entirety of which is incorporated herein by reference.

BACKGROUND

I. Field

The following description relates generally to wireless communication systems and more particularly to power control for a multi-channel access terminal.

II. Background

Wireless communication systems are widely deployed to provide various types of communication content such as voice, data, and so forth. These systems may be multiple-access systems capable of supporting communication with multiple users by sharing the available system resources (e.g., bandwidth and transmit power). Examples of multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple wireless terminals. Each terminal communicates with one or more base stations though transmissions on forward and reverse links. The forward link (or downlink) refers to the communication link from the base stations to the terminals, and the reverse link (or uplink) refers to the communication link from the terminals to the base stations. This communication link may be established through a single-in-single-out, multiple-in-single-out or a multiple-in-multiple-out (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

A MIMO system supports a time division duplex (TDD) system and a frequency division duplex (FDD) system. In a TDD system, the forward and reverse link transmissions are on the same frequency region so that the reciprocity principle allows the estimation of the forward link channel from the reverse link channel. This enables the access point to extract transmit beamforming gain on the forward link when multiple antennas are available at the access point.

Some wireless communication systems employ multiple modulation waveforms to transmit data (e.g., both CDMA and OFDMA). Each of these multiple modulation waveforms can have different power settings and should be controlled so that a device is not transmitting too much power (e.g., causing interference) nor too little power (e.g., not adequately communicating). Thus, there is a need to control the different power settings for multiple modulation waveforms.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with power control for an access terminal that employs multiple modulation waveforms (e.g., OFDMA and CDMA). The power setting of each channel can be controlled independently from the time a mobile device transmits an access probe and is included in a wireless communication system until the mobile device enters steady state.

In accordance with an aspect, a method for providing power control for at least two modulation waveforms used in a wireless communication system is provided. The method can include setting a reference power level for a reverse link control channel of a first modulation waveform using open-loop power control and closed-loop power control. The method can also include adjusting a digital gain of a reverse link control channel of a second modulation waveform and adjusting a digital gain of a reverse link data channel of the second modulation waveform. Both the reverse link control channel of the second modulation waveform and the reverse link data channel of the second modulation waveform can be adjusted relative to the reference power level.

Another aspect relates to a wireless communications apparatus that includes a memory and a processor. The memory can retain instructions related to setting a reference power level for a reverse link control channel of a first modulation waveform using open-loop power control and closed-loop power control, adjusting a digital gain of a reverse link control channel of a second modulation waveform as a function of the reference power level, and adjusting a digital gain of a reverse link data channel of the second modulation waveform as a function of the reference power level. The processor can be coupled to the memory and configured to execute the instructions retained in the memory.

Still another aspect relates to a wireless communications apparatus that facilitates power control. The apparatus can include a means for setting a reference power level for a reverse link control channel of a first modulation waveform using open-loop power control and closed-loop power control. Also included in apparatus can be a means for adjusting a digital gain of a reverse link control channel of a second modulation waveform relative to the reference power level and a means for changing a digital gain of a reverse link data channel of the second modulation waveform relative to the reference power level.

Yet another aspect relates to a machine-readable medium having stored thereon machine-executable instructions for transmitting an access probe, determining a receive power from a single sector, and setting a reference power of a reverse link control channel. The instructions can also be for changing a digital gain of a reverse link control channel of a second modulation waveform as a function of the reference power and changing a digital gain of a reverse link data channel of the second modulation waveform as a function of the reference power.

In a wireless communications system, another aspect relates to an apparatus comprising a processor. The processor can be configured to set a reference power level for a reverse link control channel of a first modulation waveform using open-loop power control and closed-loop power control. The processor can also be configured to adjust a digital gain of a reverse link control channel of a second modulation waveform and to adjust a digital gain of a reverse link data channel of the second modulation waveform. Both the reverse link control channel of the second modulation waveform and the reverse link data channel of the second modulation waveform can be adjusted relative to the reference power level.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of the various aspects may be employed. Other advantages and novel features will become apparent from the following detailed description when considered in conjunction with the drawings and the disclosed aspects are intended to include all such aspects and their equivalents.

DETAILED DESCRIPTION

Figure 1:
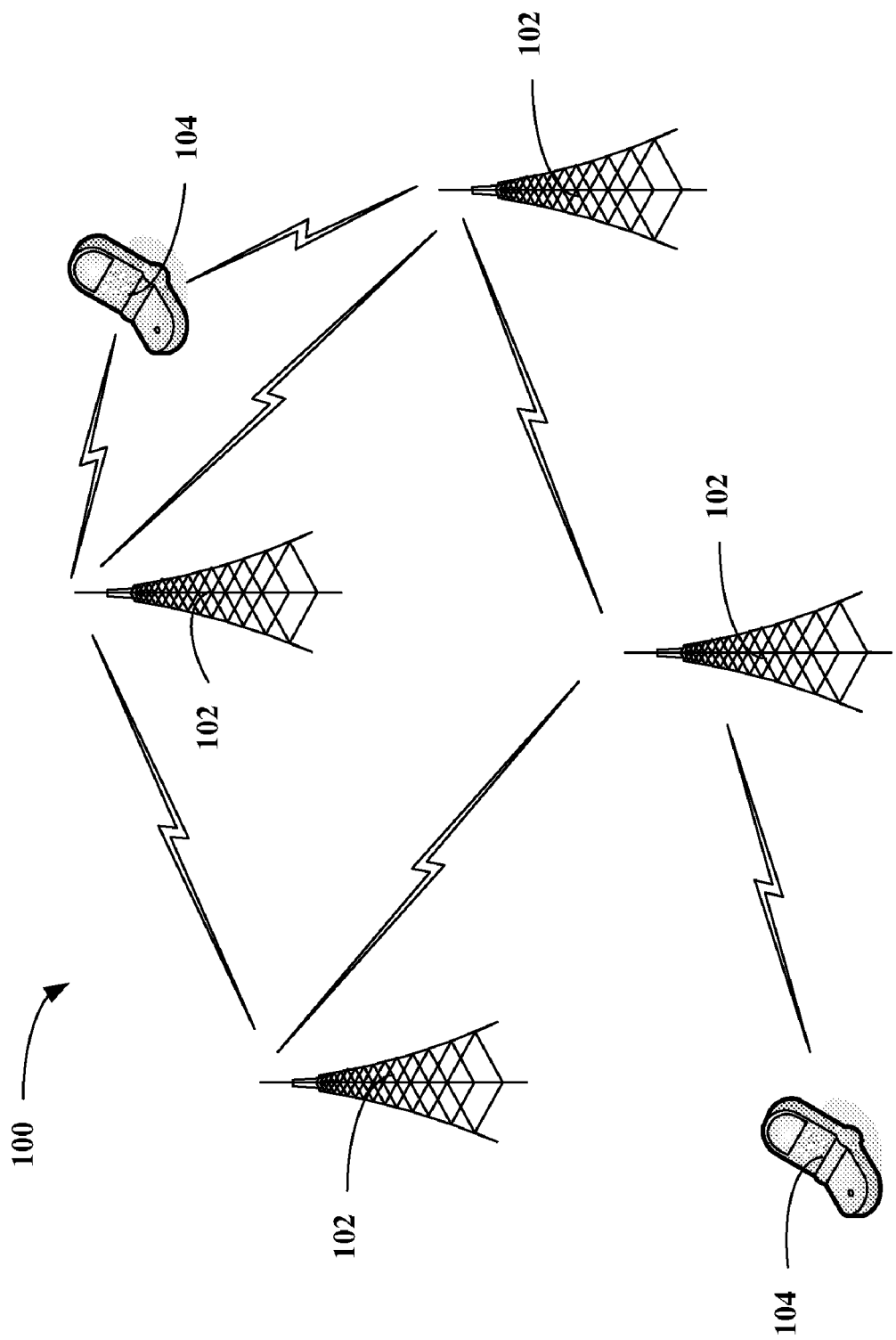
FIG. 1 illustrates a wireless communication system in accordance with various aspects presented herein.

Various aspects are now described with reference to the drawings. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing these aspects.

As used in this application, the terms "component", "module", "system", and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various aspects are described herein in connection with a wireless terminal. A wireless terminal can also be called a system, subscriber unit, subscriber station, mobile station, mobile, mobile device, device remote station, remote terminal, access terminal, user terminal, terminal, wireless communication device, user agent, user device, or user equipment (UE). A wireless terminal may be a cellular telephone, a cordless telephone, a Session Initiation Protocol (SIP) phone, a smart phone, a wireless local loop (WLL) station, a personal digital assistant (PDA), a laptop, a handheld communication device, a handheld computing device, a satellite radio, and/or another processing device for communicating over a wireless system. Moreover, various aspects are described herein in connection with a base station. A base station may be utilized for communicating with wireless terminal(s) and may also be referred to as an access point, Node B, or some other terminology.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Referring now to FIG. 1, a wireless communication system 100 in accordance with various aspects presented herein is illustrated. System 100 can comprise one or more base stations 102 in one or more sectors that receive, transmit, repeat, etc., wireless communication signals to each other and/or to one or more mobile devices 104. Each base station 102 can comprise multiple transmitter chains and receiver chains (e.g., one for each transmit and receive antenna), each of which can in turn comprise a plurality of components associated with signal transmission and reception (e.g., processors, modulators, multiplexers, demodulators, demultiplexers, antennas, etc.). Each mobile device 104 can comprise one or more transmitter chains and receiver chains, such as used for a multiple input multiple output (MIMO) system. Each transmitter and receiver chain can comprise a plurality of components associated with signal transmission and reception (e.g., processors, modulators, multiplexers, demodulators, demultiplexers, antennas, etc.), as will be appreciated by one skilled in the art.

Wireless communication system 100 can be configured to transmit and control multiple modulation waveforms, each of which can have different power settings. For example, rather than being simply an OFDMA system or a CDMA system, wireless communication system 100 can employ both OFDMA and CDMA (or other modulation waveforms). Thus, both channels can be on at substantially the same time when a mobile device 104 is transmitting since a portion of the bandwidth is for the first modulation waveform (e.g., CDMA) and a portion of the bandwidth is for the second modulation waveform (e.g., OFDMA). The power of these channels should be adjusted so that a particular mobile device is not transmitting too much power than what is nominally necessary and is not transmitting less than what is necessary to communicate effectively. Thus, utilization of the disclosed aspects can facilitate adjusting the power setting of these channels so that an appropriate amount of nominal power is utilized.

Controlling the power can be provided by directly adjusting a power amplifier. This technique is commonly utilized for a communication system that only includes a single modulation waveform, such as a communication system that is only OFDMA or only CDMA. However, in accordance with the disclosed aspects, there are at least two types of modulation waveforms utilized and, within each waveform, there can be channels that are multiplexed together. For example, in a CDMA waveform the channels that can be multiplexed together include access channels, CQI requests, and so forth. In an OFDMA waveform examples of channels that can be multiplexed include an ACK control channel, a reverse link data channel, and others. With so many different channels, each with different waveforms and each with different power settings, the power setting of each channel should be controlled independently as provided by the disclosed aspects.

Figure 2:
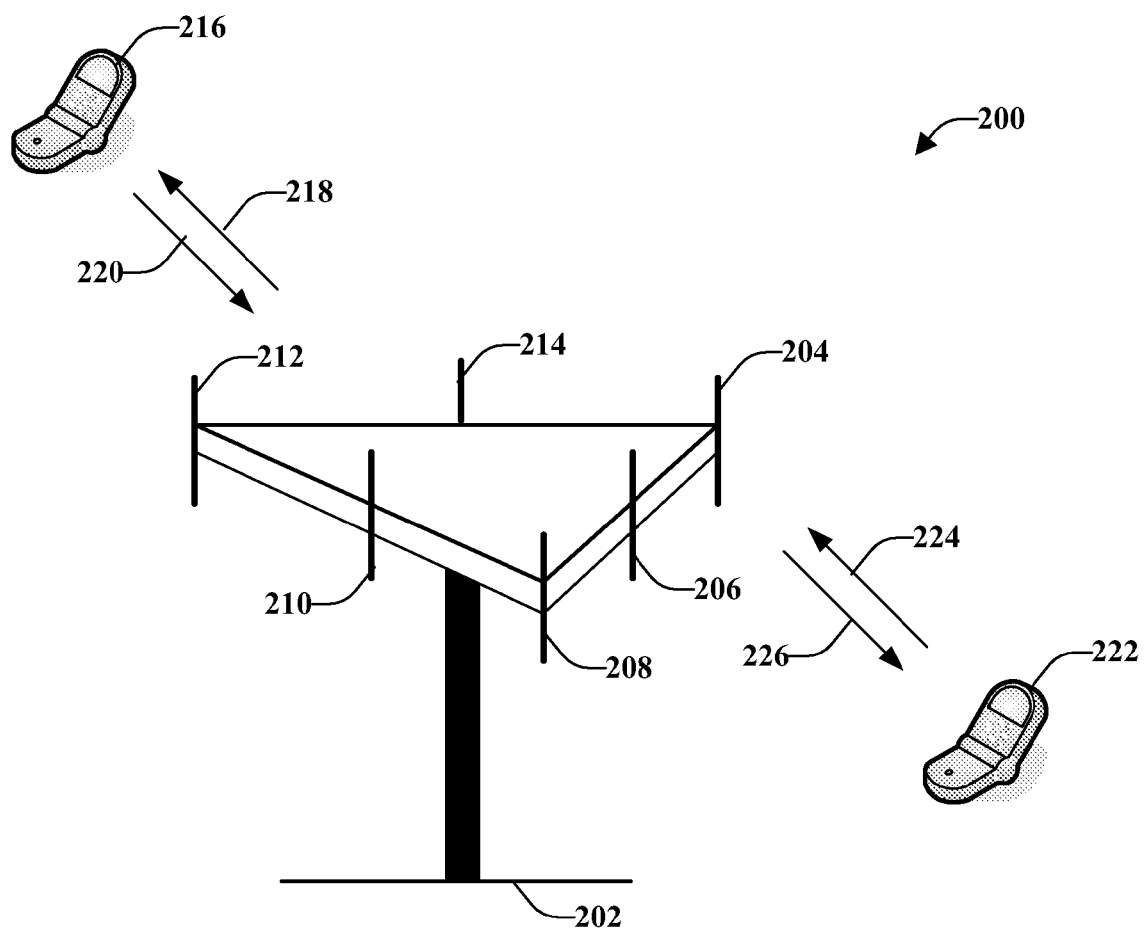
FIG. 2 illustrates a multiple access wireless communication system according to one or more aspects.

FIG. 2 illustrates a multiple access wireless communication system 200 according to one or more aspects. A wireless communication system 200 can include one or more base stations in contact with one or more user devices. Each base station provides coverage for a plurality of sectors. A three-sector base station 202 includes multiple antenna groups, one including antennas 204 and 206, another including antennas 208 and 210, and a third including antennas 212 and 214. According to the figure, only two antennas are shown for each antenna group, however, more or fewer antennas may be utilized for each antenna group. Mobile device 216 is in communication with antennas 212 and 214, where antennas 212 and 214 transmit information to mobile device 216 over forward link 220 and receive information from mobile device 216 over reverse link 218. Forward link (or downlink) refers to the communication link from the base stations to mobile devices, and the reverse link (or uplink) refers to the communication link from mobile devices to the base stations. Mobile device 222 is in communication with antennas 204 and 206, where antennas 204 and 206 transmit information to mobile device 222 over forward link 226 and receive information from mobile device 222 over reverse link 224.

Each group of antennas and/or the area in which they are designated to communicate may be referred to as a sector of base station 202. In one or more aspects, antenna groups each are designed to communicate to mobile devices in a sector or the areas covered by base station 202. A base station may be a fixed station used for communicating with the terminals.

Figure 3:
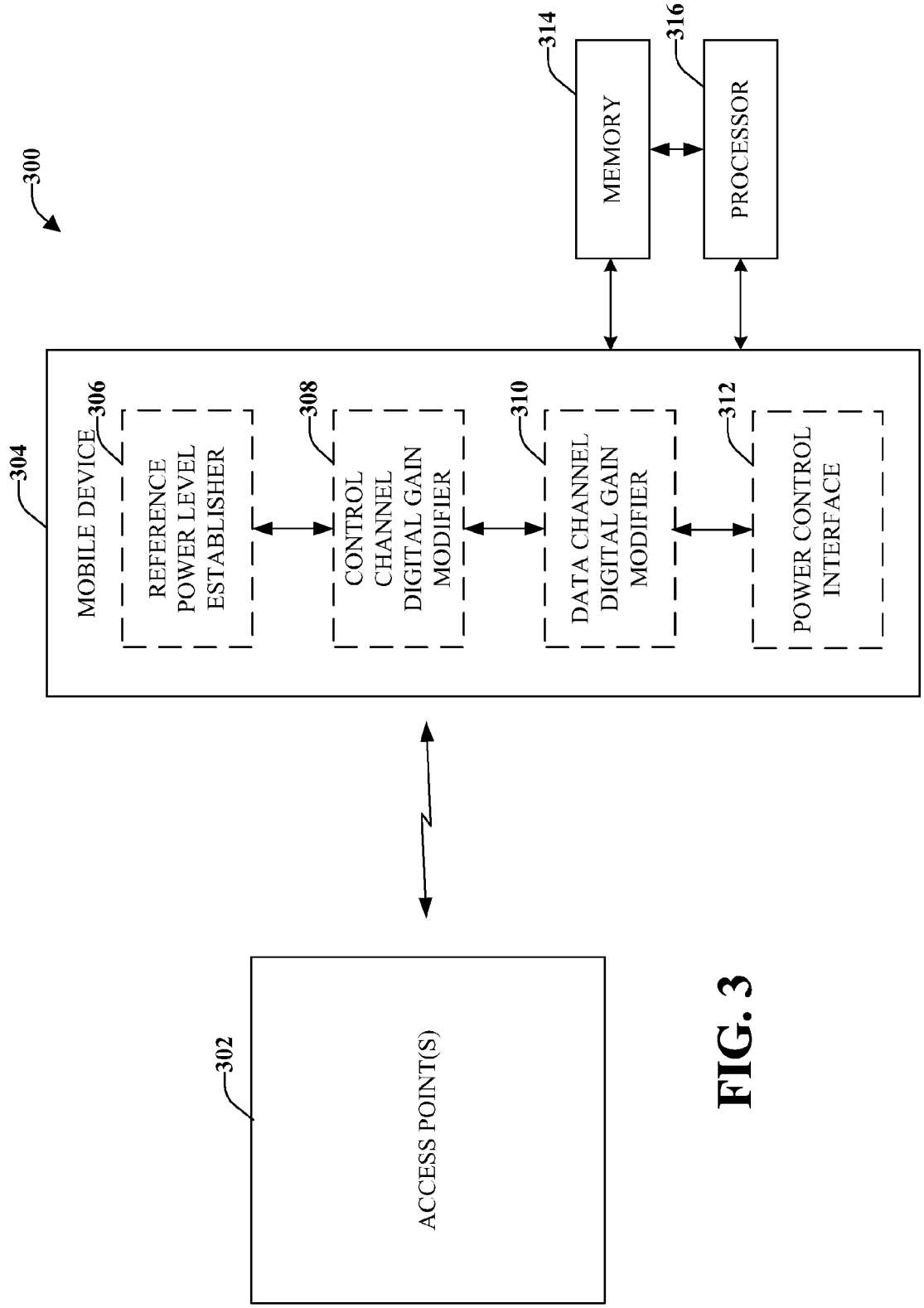
FIG. 3 illustrates a wireless communication system in which a mobile device provides power control for channels of at least two modulation waveforms.

FIG. 3 illustrates a wireless communication system 300 in which a mobile device provides power control for at least two modulation waveforms, such as for both CDMA and OFDMA channels. Although various aspects are described herein with reference to CDMA and OFDMA, the aspects are not so limited and are applicable to systems and/or transmitters that transmit multiple modulation waveforms each with different power settings.

Logical channels can be classified into Control Channels and Traffic Channels. Downlink Physical Layer (DL PHY) channels can include SCCH (Shared Control Channel); PBCCH (Primary Broadcast Channel), SBCCH (Secondary Broadcast Channel); and CPICH (Common Pilot Channel in Superframe Preamble). Uplink Physical Layer (UL PHY) Channels can include CDMA control channels, OFDMA control channels and Data Channels (DCH). CDMA control channels include a Channel Quality Indicator Channel (CQICH), a Request Channel (REQCH), and a Random Access Channel (RACH). OFDMA control channels include an Acknowledgement Channel (ACKCH).

As illustrated, wireless communication system 300 can include an access point 302 that is in communication with a mobile device 304. As mobile device 304 enters the geographic region or cell serviced by access point 302, is powered up, or transitions from an Idle State to a Connected State, the mobile device 304 can transmit an Access Probe. The Access Probe is utilized to determine which access points 302 are within the area and other information needed by mobile device 302 to utilize the wireless communication system 300. The Access Probe is sent at a Probe Power proportional to a mean received power measured from a Reverse Link Serving Sector (RLSS). Successive Access Probes can be sent at a higher power until an Access Grant is received and successfully decoded at mobile device 304.

At substantially the same times as the Access Grant is received from access point 302, mobile device 304 can transition to a Connected State. While in the Connected State, a reference power level establisher 306 of mobile device 304 can be configured to adjust a RL (Reverse Link) reference power of a first modulation waveform, such as CDMA RL, referred to as PCTRL. The reference power can be adjusted utilizing both an open-loop and closed-loop power control. In the open-loop power control, reference power level establisher 306 can update the RL reference power based upon a difference in mean received power from RLSS during successive Superframe Preamble intervals. In the closed loop power-control, reference power level establisher 306 can update a reference power of the mobile device 304 based on erasure bits sent from the access point 304, which will be discussed in further detail below. In accordance with some aspects, in closed loop power control, reference power level establisher 306 can update the reference power utilizing up-down power control bits received from access point 302. Additionally or alternatively, the reference power level can be updated by adjusting settings a Power Amplifier, an Analog Front End, and a Digital-to-Analog Converter.

A control channel digital gain modifier 308 can be configured to adjust the digital gains of a Request (REQ) control channel, a Channel Quality Indicator (CQI) control channel, an Acknowledgement (ACK) control channel, or combinations thereof. The digital gains of the control channel(s) are adjusted so that these channels are power boosted relative to the CDMA RL reference power (PCTRL). In accordance with some aspects, the digital gain of the control channel can be adjusted by a factor proportional to a reverse link control channel gain. The digital gain can be applied at a modulator block prior to an IFFT stage of a reverse link multiple modulation waveform transmitter.

A Data Channel Digital gain modifier 310 can adjust a digital gain of a Reverse Link Data Channel (R-DCH) relative to RL control channel of a first modulation waveform, such a RL CDMA control channel, by a factor proportional to a Reverse Data Channel Gain (RDCHGain). In accordance with some aspects, the digital gain modifiers can report the tuple [RDCHGain, corresponding MaxSubCarriers] in an InBandPowerControl block of the MAC header of RTC-MAC packet. In accordance with some aspects, the digital gain can be applied at a modulator block prior to an IFFT stage of a reverse link multiple modulation waveform (e.g., OFDMA-CDMA) transmitter.

Additionally or alternatively, the digital gains of the data channels and control channels are power boosted if a first modulation waveform (e.g., CDMA) channel is not present in a Reverse Link Transmission Frame. In accordance with some aspects, the digital gains of the data channels and control channels can be limited to a maximum pre-determined gain to mitigate generating interference caused to other devices within the wireless communication system.

Also included in mobile device 304 can be a power control interface 312. The power control interface 312 can utilize a power control algorithm that can apply the following rules. Erasure based closed loop power-control for RL CDMA channels is supported. The UpDown based closed-loop power control is not supported. For RDCH transmission, the mobile device 304 might not update the RDCHGain parameter based on Other Sector Interference (OSI) bits sent on superframe preamble and Fast Other OSI bits sent on F-SSCH. In other words, the power control algorithm might not attempt to mitigate inter-cell interference. For RDCH power control, mobile device 304 might ignore the RDCHGain value sent on the Reverse Link Assignment Block (RLAB). In other words, the terminal might assume no "rogue-mobile devices" and that the access point 302 does not need to power control each mobile device 304. Further information relating to the power control interface 312 and the power control algorithm will be discussed with reference to FIG. 4.

Mobile device 304 can further transmit an in-band and/or an out-of band message. The message can include details on a maximum number of reverse link data-subcarriers that can be transmitted. The maximum number of reverse link data-subcarriers can be subject to Power Amplifier limitations and maximum pre-determined gain limitations.

System 300 can include memory 314 operatively coupled to mobile device 304. Memory 314 can be external to mobile device 304 or can reside within mobile device 304. Memory 312 can store information related to setting a reference power level for a reverse link control channel of a first modulation waveform (e.g., CDMA) using open-loop power control and closed-loop power control and adjusting a digital gain of a reverse link control channel of a second modulation waveform (e.g., OFDMA) and/or a reverse link data channel of the second modulation waveform relative to the reference power level, and other suitable information related to power control of multiple modulation waveforms and communication within a network. A processor 316 can be operatively connected to receiver 304 (and/or memory 314) to facilitate analysis of information related to power control in a communication network and to execute the instructions retained in the memory. Processor 316 can be a processor dedicated to analyzing and/or generating information received by mobile device 304, a processor that controls one or more components of system 300, and/or a processor that both analyzes and generates information received by mobile device 304 and controls one or more components of system 300.

Memory 316 can store protocols associated with power control and/or taking action to control communication between mobile device 304 and base station 302, etc., such that system 300 can employ stored protocols and/or algorithms to achieve improved communications in a wireless network as described herein. It should be appreciated that the data store (e.g., memories) components described herein can be either volatile memory or nonvolatile memory, or can include both volatile and nonvolatile memory. By way of example and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of example and not limitation, RAM is available in many forms such as synchronous RAM (DRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory 314 of the disclosed aspects are intended to comprise, without being limited to, these and other suitable types of memory.

Figure 4:
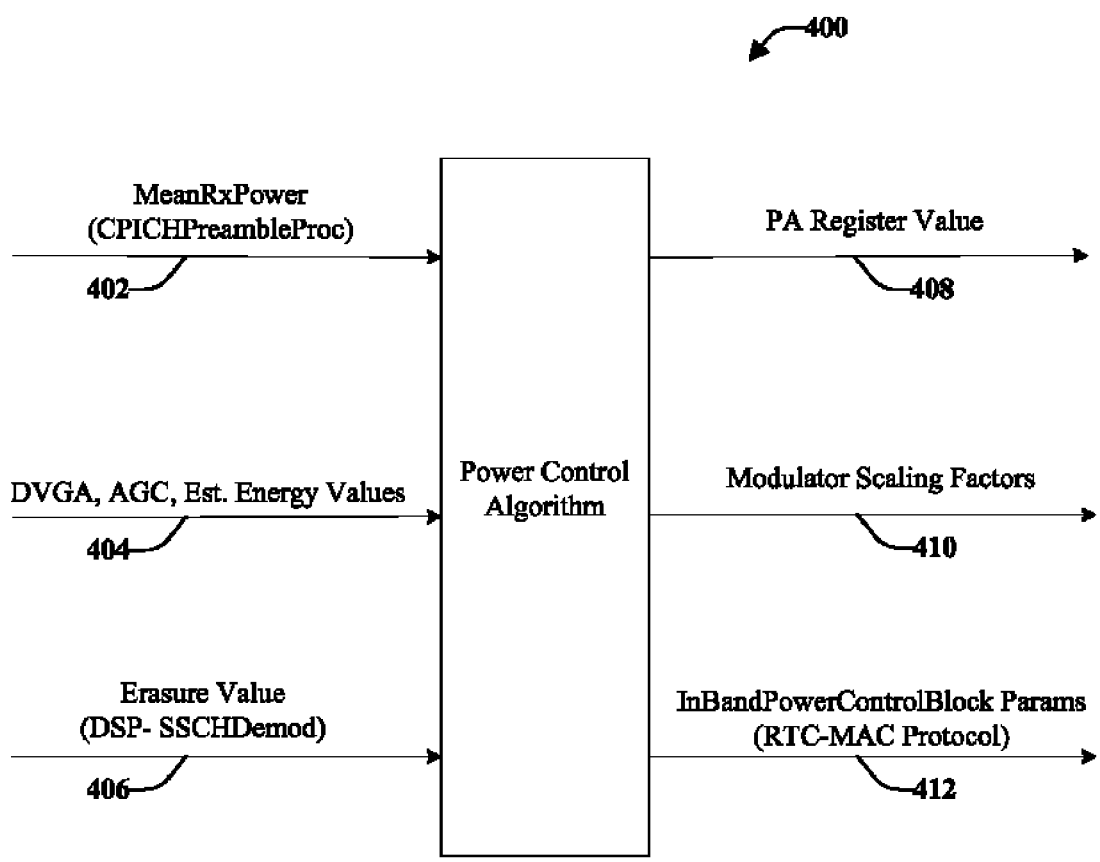
FIG. 4 illustrates a block diagram of an exemplary mobile device power control interface that utilizes a power control algorithm.

FIG. 4 illustrates a block diagram of an exemplary mobile device power control interface that utilizes a power control algorithm 400. Inputs to the power control algorithm 400 can include three parameters. The first input parameter is a Mean Receive (Rx) Power Per Antenna Per Sector 402. The Mean Rx Power Per Antenna Per Sector 402 is represented by $p_{k,s}$: Mean receive power per antenna-index k and sector-index s refers to a sector PilotPN. It is to be appreciated that this parameter is provided by the CPICH-Preamble processing algorithm. This algorithm processes Common pilots (CPICH) that occur in the superframe preamble, which will be discussed in further detail below. In accordance with an aspect, this parameter is updated every superframe duration, which can be approximately 25 msec, in an example. Furthermore, this parameter can be converted to a more meaningful dBm value, which will be discussed in further detail below.

A second input parameter is a DVGA, AGC, Estimated Energy Per Antenna 404. The DVGA, AGC, Estimated Energy Per Antenna 404 can be represented by:

$G_k$: 8 bit Analog Gain State, for each antenna (indexed by k);

$\bar{E}_k$: Filtered Estimated Energy in linear domain across multiple superframes at the output of an ADC, for each antenna (indexed by k); and $E_k$: instantaneous estimated energy in linear domain at the current superframe at the output of the ADC, for each antenna (indexed by k).

It is to be appreciated that the above parameters can be computed by the DVGA block and are common across all sectors. In an example, these parameters can be updated every superframe preamble (e.g., about 25 msec).

The third input parameter is an Erasure Value Per Sector 406. The Erasure Value Per Sector can be represented by:

$e_s$: Erasure Value for sector-index, where "s" refers to a sector PilotPN.

Again, it is to be appreciated that this parameter can be computed by an SSCH demod processing algorithm for the appropriate FL PHYFrame indices "f" given by the following equation:

$$(MACID) \bmod (FLPCReportInterval) = (12s+f) \bmod (FLPCReportInterval) \quad \text{Equation 1}$$

It is to be appreciated that the above parameters can be computed by the DVGA block and are common across all sectors. In an example, these parameters can be updated every superframe preamble or, in accordance with some aspects, approximately 25 msec.

The outputs from the power control algorithm can include a Power Control Register Index Value 408. The output Power Control Register Index Value can be represented by:

PCReg: PA register value that controls an analog transmit power of the mobile device.

It is to be appreciated that the mobile device can update this value every RL PHYFrame with RL CDMA control channel.

Another output is a Modulator Scaling Factors 410. This output 410 can include the following registers, which can be programmed by the power control interface 410. The registers include MOD_RACH, MOD_RCQICH, MOD_REQCH, R-ACKCH Packet Descriptor, and MOD_FD_BUFF. It should be appreciated that these registers can be referred to by other names and the registered described herein are utilized to describe the various aspects. The field of the MOD_RACH can be RACH_POWER. The field of the MOD_RCQICH can be RCQICH_POWER. The MOD_REQCH can include the field RREQCH_POWER. The R-ACKCH Packet Descriptor register can include the field R-ACKCH_POWER. The MOD_FD_BUFF register can include the field POWER_DENSITY of Packet Segment.

In accordance with some aspects, RACH_Power, RCQICH_POWER, and RREQCH_POWER can each be a s1.14 bit number and R-ACKCH_POWER and POWER_DENSITY of Packet Segment can each be a s2.13 bit number. The s1.14 represents a signed number has one integer bit and fourteen fractional bits. The s2.13 represents a two integer bit and thirteen fractional bits. One or more of the various aspects herein are described with reference to this representation, (s1.14 and/or s2.13) which is only a single manner in which the disclosed aspects can be implemented. It should be understood that other representations can be chosen to implement the disclosed aspects.

Another output can be an InBandPowerControl Parameters (RTC-MAC Protocol) 412. In accordance with an aspect, the output InBandPowerControl Parameters (RTC-MAC Protocol), the power control algorithm may update the following fields of the InBandPowerControlBlock of the RTC MAC packet: RDCHGainIndex and MaxSubCarriers. The RDCHGainIndex can have the following range of values:

RDCHGainIndex=floor[(7.5/(RDCHGainMax−RDCHGainMin))*(RDCHGain−RDCHGainMin)].

The MaxSubCarriers can have the range of values 0, $2^n$, where n=4 to 11.

In accordance with some aspects aspect, the power control algorithm 400, implemented by power control interface 410 can include configuration parameters. These configuration parameters can include the OAM parameters, and their default values. In an example, these values can be changed every time the mobile device is reset, but are not changed during normal operation of the mobile device.

An example of the Power Control Configuration Parameters is given in Table 1 below:

TABLE 1

| Parameter | Protocol | Range of Values | Default Value |
|---|---|---|---|
| ProbeRampUpStepSize | ExtendedChannelInfo OMP | 0.5 * (1 + n) dB. (n = 0 to $2^4$ − 1) | 3 dB |
| OpenLoopAdjust | ExtendedChannelInfo OMP | 70 + n dB. (n = 0 to $2^8$ − 1) | 81 dB |
| OpenLoopTransitionTime | Configuration Attribute RCC MAC | 7.5n msec n = 0, 1, 2, 3. | 23 msec |
| RLCtrlPCMode | ExtendedChannelInfo OMP | 0 | 0 |
| FLPCReportInterval | OMP | 4 | 4 |
| PowerControlStepUp | ASMP | (n + 1) * 0.25 dB n = 0 to 7 | 1 dB |
| PowerControlStepDown | ASMP | (n + 1) * 0.25 dB n = 0 to 7 | 1 dB |
| ACKChannelGainAdjustment | Local variable of RCC-MAC | 0+ dB | 6 dB |
| REQChannelGainj, j = 0, 1, 2, 3 | ExtendedChannelInfo OMP | −8 dB to 7 dB in 1 dB increments. | 3 dB |
| CtrlAccessOffset | ExtendedChannelInfo OMP | −4 dB to 3 dB in 1 dB increments. | 0 dB |
| CQICHPowerBoostForHandoff | Configuration Attribute | 0.125n dB n = 0 to $2^8$ − 1 | 6 dB |
| REQCHPowerBoostForHandoff | Configuration Attribute | 0.125n dB n = 0 to $2^8$ − 1 | 6 dB |
| DataCtrlOffset | pBCH1 | 0.5n dB n = 0 to $2^4$ − 1 | 7.5 dB |
| RDCHGainMin | ASMP | (0.25 * n − 4) dB n = 0 to 63 | 11.75 |
| RDCHGainMax | ASMP | (RDCHGainMin + n) dB n = 0 to 15 | 26.75 |
| ADC_PWR | Calibrated Power Level at the ADC output | −100:0.25:0 dB | −17.0 dBm |
| REF_PWR | Calibration Power Level at RFEE Input | −200:0.25:50 dB | −56.0 dBm |
| RX1_OFFSET_0_7 | Power Adjustment when AGC Gain State 1 is on | 0:0.25:50 dB | 21 dB |
| RX1_OFFSET_7_14 | Power Adjustment when AGC Gain State 2 is on | 0:0.25:50 dB | 21 dB |
| RX_RFEE_PATH_LOSS | RFEE Path Loss | 0:0.25:100 dB | 0 dB |
| AT_TX_GainCTL Table | 512 entry table with a mapping between dBm value and the 9-bit PA register | x | x |

TABLE 1-continued

| Parameter | Protocol | Range of Values | Default Value |
|---|---|---|---|
| REFLEVEL | This is the PCTRL Reference Level in the digital baseband, measured in units of # of LSBs | 1-15 | 3 |

Figure 5:
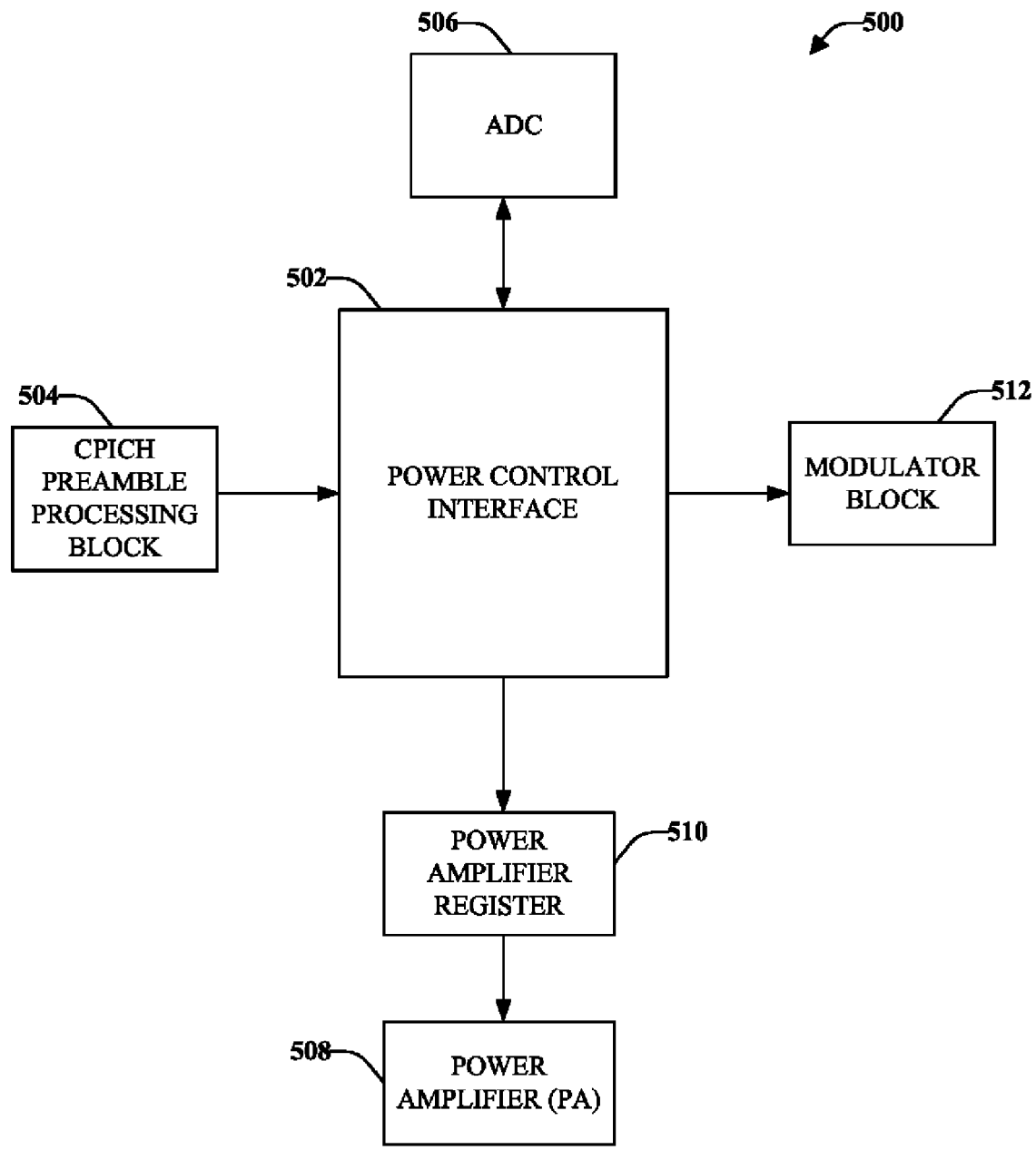
FIG. 5 illustrates various components of mobile device that utilize a power control algorithm in accordance with the disclosed aspects.

FIG. 5 illustrates various components of mobile device 500 that utilize a power control algorithm 502 in accordance with the disclosed aspects. It should be noted again that various aspects are described herein with reference to CDMA and/or OFDMA for ease of understanding, however, the aspects are not so limited and are applicable to multiple modulation waveforms each with different power settings. The operation of the power control algorithm can include a computation of a mean Rx power. The mean receiver (Rx) power per-antenna per-sector can be estimated by a CPICH Preamble processing block 504 and is denoted as $p_{k,s}$, where k is the antenna index and s is the sector-index, as discussed above with reference to FIG. 4. These values are digital numbers that should be translated to a meaningful dBm value. To this end, an estimated energy computed at the output of an ADC 506 (as discussed above) may be used, since this value has a direct mapping to the dBm value, depending on the AGC 504 gain state. The estimated energy parameter at the output of ADC 506 is denoted $E_k$. It is to be appreciated that this parameter has contributions from all sectors (e.g., multiple base stations).

From the above, the estimated energy at the output of the ADC 504 "per-sector" can be computed for sector-index s and antenna index k as follows:

$$E_{k,s} = \frac{p_{k,s}}{\sum_s p_{k,s}} E_k \quad \text{Equation 2}$$

The above estimated energy can be mapped to dBm at physical receive antennas by normalizing it to the full-scale ADC power and subtracting the analog gain as follows:

$$AE_{k,s} = 10\log_{10}\left[\frac{E_{k,s}}{2^{2(ADBitWidth-1)}}\right] - ADC\_PWR + \quad \text{Equation 3}$$

$$REF\_PWR + RX\_RFFE\_PATH\_LOSS +$$

$$RX1\_OFFSET\_0\_7 \times I_{GainState1} +$$

$$RX1\_OFFSET\_7\_14 \times I_{GainState12} \text{ (in dBm)}$$

Where $I_{GainState1}=1$ when Analog Gain State 1 is active and Analog Gain State 2 is inactive; and $I_{GainState12}=1$ when Analog Gain States 1 and 2 are active. Otherwise, these variables take on the value of 0. In one example, parameter ADBitWidth=14-bits, and the calibration variables REF_PWR, RX_RFEE_PATH_LOSS, RX!_OFFSET_0_7 and RX1_OFFSET_7_14 are known parameters, or are user-programmable on power-up.

From the above, the mean received power averaged across all receive antennas (in dBm) is given as:

$$AE_s = 10\log_{10}\left[\frac{1}{M_R}\sum_k 10^{[AE_{k,s}/10]}\right] \text{ (in dBm)} \quad \text{Equation 4}$$

where $M_R$ is the number of receiver antennas for the mobile device.

In accordance with an aspect, an Access Probe Power Computation can be calculated as follows. To transition from the Idle State Protocol to the Connected State Protocol, the mobile device 500 sends Access Probes to the access point over the RL CDMA control channel. The InitialAccessPower can be determined based on the OpenLoopAdjust parameter (obtained from overheads) and the mean received power of the CPICH Preamble pilot from the sector where the access attempt is being made.

InitialAccessPower=$-AE_{TargetSector}$-OpenLoopAdjust   Equation 5 where the MeanRxPower [$AE_{TargetSector}$(dBm)] of the target sector shall be updated at each Superframe Preamble, throughout the access procedure.

The OpenLoopAdjust parameter is typically computed as:

OpenLoopAdjust=-AP_Transmit_Power (dBm)-Target AP Receive Power (in dBm).

As an example, a nominal "Target AP ACH receive Power" of −114 dBm can be assumed that corresponds to a target C/I=−17 dB for the ACH Probe received at the access point a Noise Floor of −97 dBm. Furthermore, a nominal AP_Transmit_Power of 33 dBm can be assumed. These parameters lead to an OpenLoopAdjust value=81 dB.

In accordance with an aspect, if the mobile device 500 does not successfully decode an Access Grant from the access point, then the mobile device 500 transmits Access Probes as successively increasing power levels computed as:

ProbePower=InitialAccessPower+ProbeRampUpStepSize*(ProbeNumber−1)   Equation 6

The mobile power control interface 502 transmits probes at the desired ProbePower (in dBm), by programming a Power Amplifier 508 accordingly. Specifically, the power control interface 502 utilizes the "AT_TX_GainCTL" Table that converts the above computed ProbePower (dBm) value to an x-bit value and communicates it to a power amplifier register 510. Where x is an integer and in accordance with an aspect, x is equal to 9. These x-bits are signaled to the power amplifier 508 to allow transmission at the desired power. The AT_TX_GainCTL table is programmable.

In one example, during the Access Procedure, the power control interface 502 programs a Modulator block 512 as follows. The RACK_POWER field of a MOD_RACK register is set to a value $2^{\wedge}(-11)$.

According to another aspect, the RL CDMA Reference Power (PCTRL) Computation may be calculated as follows. After the mobile device 500 successfully decodes an Access Grant from an access point, the mobile device 500 initializes a RL CDMA control channel reference power parameter called PCTRL as follows:

$$P_{CTRL} = \text{ProbePower} + \text{CtrlAccessOffset} \quad \text{Equation 7}$$

This parameter can be updated using open-loop and closed loop power control as discussed below.

In an example of open loop power control, if OpenLoop-TransitionTime is set to zero, the mobile device does not perform the open loop power adjustment procedures described in this section. Otherwise, the mobile device measures the mean received power of the RLSS [$AE_{RLSS}$] during each superframe preamble and compares it to the mean received power measured during the previous superframe preamble of the RLSS. First, a step change of ReceivedPowerChange (dB) in the mean received superframe preamble power since the previous superframe preamble of the RLSS is calculated as:

$$ReceivedPowerChange = AE_{RLSS}[currentSuperFrame] - \quad \text{Equation 8}$$
$$AE_{RLSS}[PreviousSuperFrame]$$

The $P_{CTRL}$ value transitions to its final value of $P_{CTRL}$-ReceivedPowerChange according to the following rule:

$$P_{CTRL}(t) = P_{CTRL}(0) - ReceivedPowerChange \times \quad \text{Equation 9}$$
$$\min\left\{\frac{t}{OpenLoopTransitionTime}, 1\right\},$$

where t denotes the time since the last superframe preamble of the RLSS and is measured in the same units as OpenLoopTransitionTime.

In an aspect, the power control interface 502 (which can be referred to as the software of mobile device 500) transmits the CDMA control channels at reference power PCTRL (in dBm), by programming the power amplifier 508 accordingly. Specifically, the power control interface 502 utilizes the "AT_TX_GainCTL" Table that converts the above computed ProbePower (dBm) value to an x-bit value and transmits it to the power amplifier register 510, where x is an integer and in accordance with an aspect is equal to nine. These x-bits are then signaled to the power amplifier 508 to allow transmission at the desired power.

In an example of closed loop power control, the RLCtrlPC-Mode for the RLSS is set to 'ErasureBased' (e.g., an 'ErasureBased' power control is implemented). In this mode, the mobile device 500 can handle the FL CEI bit intended for the mobile device that is sent in the F-SSCH of the RLSS as the power control command for the RLSS. Specifically, the mobile device 500 monitors the FL CEI bit in the FL PHY-Frame indices "f" computed below, provided it transmitted a valid R-CQICH report in the most immediate RL PHYFrame containing a CDMA control segment prior to FL PHY Frame index "f" according to Equation 1 above.

When the CEI bit transmitted over the appropriate F-SSCH is '1', for the power update operation the mobile device increases the corresponding $P_{CTRL}$ by PowerControlStepUp dB. When the CEI bit transmitted over the appropriate F-SSCH is '0', for the power update operation the mobile device decreases the corresponding $P_{CTRL}$ by PowerControlStepDown dB. It is to be appreciated that these changes in $P_{CTRL}$ values can be in addition to any changes dictated by the open-loop power control algorithm discussed above.

In accordance with an aspect, the power control interface 502 transmits the CDMA control channels at the updated reference power PCTRL (in dBm), by programming the power amplifier 508 accordingly. Specifically, the power control interface 502 utilizes the AT_TX_GainCTL Table that converts the above computed PCTRL (dBm) value to an x-bit value and transmits it to power amplifier register 510. These x-bits (where x can be 9) are then signaled to the power amplifier 508 to allow transmission at the desired power. The mobile device 500 adjusts the relative power levels of the RL CDMA control channels (with respect to the reference power PCTRL) and R-ACK control channel "digitally", which will be described in detail below.

According to an aspect, if the R-CQICH report does not carry a FL handoff request (mobile device is not in handoff) then $$P_{CQICH} = P_{CTRL} \quad \text{Equation 10}$$

To accomplish this, the power control interface 502 can program the Modulator block 512 by setting the RCQICH_POWER field (s1.14) of the MOD_RCQICH register to a value $2^{-(14-REFLEVEL)}$. If the R-CQICH report carries a FL handoff request (e.g., DFLSS is different from FLSS), the CQI report is a CQICHCTRL, the ActiveSetIndex field in the CQI is the active set index of the DFLSS, and the DFLSS flag in the CQI is set to '1'), then $$P_{CQICH} = P_{CTRL} + \text{CQICHPowerBoostForHandoff} \quad \text{Equation 11}$$

To accomplish this, the power control interface 502 can program the Modulator block 512 by setting the RCQICH_POWER field (s1.14) of the MOD_RCQICH register to a value:
$\text{floor}\{2^{-(14-REFLEVEL)} \times 10^{CQICHPowerBoostForHandoff/20} \times 2^{14}\}$ which in s1.14 format has the interpretation:

$$\frac{\text{floor}\left\{2^{-(14-REFLEVEL)} \times 10^{CQICHPowerBoostForHandoff/20} \times 2^{14}\right\}}{2^{14}}. \quad \text{Equation 12}$$

It is to be appreciated that, if the R-CQICH report carries an FL handoff request and CQICHPowerBoostForHandoff is greater than zero, the mobile device 500 ignores the FL CEI bit from the RLSS, if the Erasure Bit from the RLSS indicates a Power Down.

In accordance with an aspect, REQChannelGainj is the same for all RL QoS levels, j. The R-REQCH transmit power can be computed for the RLSS and DRLSS according to the following rules: If the DRLSS is different from the RLSS, and then $$P_{REQCH} = P_{CTRL} + \text{REQChannelGain}_j + \text{REQCHPowerCoostForHandoff}$$

To accomplish the above power boosts, the power control interface 502 can program the Modulator block 512 as follows. The power control interface 502 can set the RREQCH_POWER field (s1.14) of the MOD_RREQCH register to a value:
$\text{floor}\{2^{-(14-REFLEVEL)} \times 10^{(REQChannelGainj+REQCHPowerBoostForHandoff)/20} \times 2^{14}\}$ which in s1.14 format has an interpretation:

$$\frac{\text{floor}\left\{2^{-(14-REFLEVEL)} \times 10^{\left(\begin{smallmatrix}REQChannelGainj+\\REQCHPowerBoostForHandoff\end{smallmatrix}\right)/20} \times 2^{14}\right\}}{2^{14}} \quad \text{Equation 13}$$

If the DRLSS is the same as the RLSS, then $$P_{REQCH} = P_{CTRL} + REQChannelGain_j \qquad \text{Equation 14}$$

To accomplish the above power boosts, in one example, the power control interface 502 can program the Modulator 512 block by setting the RREQCH_POWER field (s1.14) of the MOD_RREQCH register to a value:

$$\text{floor}\{2^{-(14-REFLEVEL)} \times 10^{(REQChannelGain_j)/20} \times 2^{14}\}$$

in which s1.14 format has an interpretation $$\frac{\text{floor}\left\{ \begin{array}{l} 2^{-(14-REFLEVEL)} \times \\ 10^{(REQChannel\ Gain_j)/20} \times 2^{14} \end{array} \right\}}{2^{14}} \qquad \text{Equation 15}$$

In an aspect, unlike R-CQICH and R-REQCH, the R-ACKCH may be transmitted using OFDM modulation. For example, the R-ACKCH transmit power can be computed only for the FLSS according to the following expression:

$$P_{ACK} = P_{CTRL} + ACKCtrlOffset + \qquad \text{Equation 16}$$
$$ACKChannelGain + ACKChannelGainAdjustment$$

The ACKChannelGainAdjustment a programmable OA&M parameter and set constraints:

$ACKCtrlOffset = DataCtrlOffset$ $ACKChannelGain =$ $$\left\{ \begin{array}{ll} RDCHGain - 10\log10\left(\frac{N_{ACK}}{N_{CTRL-SUBCARRIERS}}\right) \forall & I_{CDMA} = 1 \\ RDCHGain_{NonRLCC} - 10\log10\left(\frac{N_{ACK}}{N_{CTRL-SUBCARRIERS}}\right) \forall & I_{CDMA} = 0 \end{array} \right\}$$

where $I_{CDMA}$ is an indicator function. $I_{CDMA}=1$ indicates RL PHYFrames containing RL CDMA control segment, and $I_{CDMA}=0$ indicates RL PHYFrames that do not contain RL CDMA control segment, where $N_{ACK}=8$ is the number of ACK sub-carriers, for any given OFDM symbol.

The above can help ensure the RACK transmit PSD to be ACKChannelGainAdjustment (dB) hotter than R-DCH transmission. It is to be appreciated that in some circumstances R-ACK may need to be sent at a higher PSD than R-DCH to minimize ACK-to-NACK error, especially in circumstances where ACK-to-NACK detection is not available. To provide R-ACK transmission at the appropriate power, the power control interface 502 can program the Modulator block 512 by setting the RACKCH_POWER field (s2.13) of the R-ACKCH Packet Descriptor to a value:

$$\text{floor}\left\{ \begin{array}{l} 2^{-(14-REFLEVEL)} \times \\ 10^{\left( \begin{array}{l} ACKCtrlOffset+ACKChannelGain + \\ ACKChannelGainAdjustment \end{array} \right)/20} \times 2^{13} \end{array} \right\}$$

which in s2.13 format has an interpretation:

$$\frac{\text{floor}\left\{ \begin{array}{l} 2^{-(14-REFLEVEL)} \times \\ 10^{\left( \begin{array}{l} ACKCtrlOffset+ACKChannelGain + \\ ACKChannelGainAdjustment \end{array} \right)/20} \times 2^{13} \end{array} \right\}}{2^{13}} \qquad \text{Equation 18}$$

According to another aspect, for a given RL-ATA, the mobile device 500 might adjust the digital gain of the R-DCH channel relative to RL CDMA control channel by a factor proportional to RDCHGain. This is referred to as a "Delta-based power control." In an example, the parameter RDCHGain is only defined for RL Frames with CDMA control channel, as discussed in the following:

If the mobile device 500 has a RL-ATA corresponding to a RL Frame with CDMA control segment, the mobile device 500 can transmit R-DCH sub-carriers with the highest RDCHGain that is permitted by total power amplifier limitations. If the RDCHGain>RDCHGainMax, the mobile device 500 can transmit R-DCH sub-carriers at RDCHGainMax. Next, the mobile device 500 can compute the associated Maximum supportable sub-carriers assuming total power amplifier limitations and the above computed RDCHGain. If the maximum supportable sub-carriers is less than sixteen tones, then the mobile device 500 assumes maximum supportable sub-carriers equals sixteen tones and computes the corresponding RDCHGain. The mobile device then reports the tuple [RDCHGain and MaxSubCarriers] in the InBandPowerControl block of the MAC header of RTC-MAC packet. This assists the AP RL-scheduler algorithm to determine the appropriate RL-ATA for future transmissions.

If the mobile device 500 has a valid RL-AT corresponding to RL Frame with "NO" CDMA control segment, the mobile Equation 17 device 500 can transmit R-DCH sub-carriers with the highest power spectral density (call this parameter $RDCHGain_{NonRLCC}$) that is permitted by total power amplifier limitations. If the $RDCHGain_{NonRLCC}$>RDCHGainMax, the mobile device 500 can transmit R-DCH sub-carriers at RDCHGainMax. The mobile device 500 can compute the Maximum supportable sub-carriers assuming RDCHGainMax, total power amplifier limitations and the presence of RL Frame with CDMA control segment. If the maximum supportable sub-carriers is less than sixteen tones, then the mobile device 500 can assume maximum supportable sub-carriers equals sixteen tones and computes the corresponding RDCHGain. The mobile device 410 can report the tuple [RDCHGain and MaxSubCarriers] in the InBandPowerControl block of the MAC header of RTC-MAC packet. This assists the AP RL-scheduler algorithm to determine the appropriate RL-ATA for future transmissions.

For RL PHYFrames containing CDMA RLCC, the power control interface 502 can program the Modulator block 512 by setting the Power Density (s2.13) of the MOD_FD_BUFF to a value $$\text{floor}\{2^{-(14-REFLEVEL)} \times 10^{(DataCtrlOffset+RDCHGain)/20} \times 2^{13}\}$$

which in s2.13 format has an interpretation $$\frac{\text{floor}\left\{ \begin{array}{l} 2^{-(14-REFLEVEL)} \times \\ 10^{(DataCtrlOffset-RDCHGain)/20} \times 2^{13} \end{array} \right\}}{2^{13}} \qquad \text{Equation 19}$$

For PHYFrames without CDMA RLCC, the power control interface 502 can program the Modulator block 512 by setting the Power Density (s2.13) of the MOD_FD_BUFF to a value floor$\{2^{-(14-REFLEVEL)} \times 10^{(DataCtrlOffset+RDCHGain_{NONRLCC})/20} \times 2^{13}\}$ which in s2.13 format has an interpretation:

$$\text{floor}\left\{\frac{2^{-(14-REFLEVEL)} \times}{10^{(DataCtrlOffset-RDCHGain_{NONRLCC})/20} \times 2^{13}}\right\} \quad \text{Equation 20}$$
$$\overline{2^{13}}.$$

It is to be appreciated that the $RDCHGain_{NonRLCC}$ parameter is computed only for RL PHYFrames that do no contain RL CDMA control segment.

In an aspect, the mobile device 500 reports the maximum supportable sub-carriers (MaxSubCarriers) for the RDCH-GainMax through the in-band MAC header of the RL-packet (in the InBandPowerControlBlock). The exception being that if the maximum supportable sub-carriers (MaxSubCarriers) is smaller than sixteen, then MaxSubCarriers is set to sixteen and the corresponding RDCHGain less than RDCHGainMax is reported. As explained above, RDCHGain is computed only for RL PHYFrames with RL CDMA control segment.

In accordance with an aspect, the maximum supportable sub-carriers is computed by solving for Nc=Nc,max, resulting in:

$$Nc_{MAX}=2^{floor\,[log_2(10\Phi/10)]} \quad \text{Equation 21}$$

where $$\Phi = 10\log_{10}\left[\frac{P_{MAX\_LIN} - P_{RLCC\_LIN}}{1+10^{-\gamma/10}}\right] - \quad \text{Equation 22}$$
$$P_{CTRL} - RDCHGainMiv +$$
$$10\log_{10}N_{CTRL-SUBCARRIERS} - DataCtrlOffset$$

If Nc,max computed above is smaller than sixteen tones, then Nc,max is set equal to sixteen, and the corresponding RDCH-Gain is calculated as:

$$RDCHGain = \begin{bmatrix} 10\log_{10}\left[\frac{P_{MAX\_LIN} - P_{RLCC\_LIN}}{1+10^{-\gamma/10}}\right] - \\ DataCtrlOffset - 10\log_{10}(N_{C,MAX} = 16) + \\ 10\log_{10}[N_{CTRL-SUBCARRIERS}] - P_{CTRL} \end{bmatrix} \quad \text{Equation 23}$$

In one example of closed loop power control, the closed-loop power control on the RL CDMA channel enables the mobile device 500 to close the RL link. In addition, it can be utilized to compensate for fading and interference (since there no H-ARQ on the control channel). The closed-loop power control on the RL CDMA channel can further be utilized to prevent a "near-far" effect on the CDMA control channel and/or to conserve energy as much as possible at the mobile device, resulting in each user (e.g., mobile device) transmitting the minimum power needed to close the link. Additionally or alternatively, the closed-loop power control on the RL CDMA channel can be utilized to mitigate interference to other sectors.

The closed-loop power control can operate in two modes: Erasure based closed loop power control and/or UpDown based power-control. In the Erasure based closed loop power-control, the mobile device updates its reference power based on erasure bits sent from the access point. In the UpDown based power-control, the reference power of the mobile device is updated based on up-down power control bits sent from the access point. The RL CDMA control channels (R-CQICH and R-REQCH) are decoded by the access point assuming erasure decoding. The following performance can be performed on this channel:

Pr[Erasure]<50%

Pr[Error|Not Erased]<0.1%

For erasure-based power control, the access point can ensure a target erasure rate, by sending Erasure commands to the mobile device in accordance with the following equation:

Pr[Erasure] PowerControlStepUp=(1−Pr[Erasure])
    (PowerControlStepDown). Equation 24

An example of delta based power control may be implemented as follows. For a given RL-ATA, the R-DCH channels are power-boosted relative to RL CDMA control channel by a factor proportional to RDCHGain. This is referred to as a "delta based power control." The basic philosophy of delta based power control is that a mobile device desires to transmit as much as possible (max PA power) without creating intra-cell and inter-cell interference.

Intra-cell interference is caused by ICI at the access point, when a certain mobile device received power is substantially higher relative to other mobile devices with adjacent frequency resources in the same PHYFrame. The effect of this ICI is mitigated by limiting RDCHGain to a factor RDCH-GainMax, the latter defined in the Active Set Message Protocol. In general, this results in RDCHGainMin<=RDCHGain<=RDCHGainMax. RDCH-GainMin can be set to achieve a minimum target rate for edge users (e.g., mobile devices). RDCHGainMax can be pegged to RDCHGainMin to satisfy the ICI Margin.

Inter-cell interference can be controlled by updating the RDCHGain parameter based on the Other Sector Interference (OSI) bits sent on superframe preamble and Fast Other OSI bits sent on F-SSCH from sectors other than RLSS, as well as the measured ChanDiff (difference in path loss between a certain sector and RLSS) for these sectors. However, it is to be appreciated that in some examples, this aspect of power control might not be implemented.

In accordance with an aspect, the access point can be allowed to power control a rogue-mobile device by mandating the mobile device transmit at a RDCHGain value sent on a RLAB. From a system capacity point of view, conceptually "strong" users should transmit at high RDCHGain and "weak" users should transmit at low RDCHGain, to maximize sector throughput.

In an example of a RDCHGain Computation, the power of the R-DCH, PDCH, for RL Frames with RL CDMA control segment can be computed as:

$$P_{DCH}=P_{CTRL}-10\log_{10}(N_{CTRL-SUBCARRIERS})+10\log_{10}(N_c)+RDCHGain+DataCtrlOffset \quad \text{Equation 25}$$

The R-ACKCH transmit power can be computed only for the FLSS according to the following expression:

$$P_{ACK} = P_{CTRL} + ACKCtrlOffset + \quad \text{Equation 26}$$
$$ACKChannelGain + ACKChannelGainAdjustment$$

In one example, the following constraints can be assumed:

$$ACKCtrlOffset = DataCtrlOffset$$

$$ACKChannelGain = RDCHGain - 10\log10\left(\frac{N_{ACK}}{N_{CTRL-SUBCARRIERS}}\right)$$

Equation 27 therefore:

$$\gamma = P_{DCH} - P_{ACK} = \qquad\qquad\text{Equation 28}$$

$$10\log_{10}\left[\frac{N_c}{N_{ACK}}\right] - ACKChannelGainAdjustment$$

Mobile device power amplifier limitation results in the equality:

$$P_{DCH\_LIN} + P_{ACK\_LIN} + P_{RLCC\_LIN} = P_{MAX\_LIN} \qquad\text{Equation 29}$$

where the subscript "LIN" refers to values computed in linear domain. In other words:

$$P_{DCH} = 10\log_{10} P_{DCH\_LIN} \text{ and } 10^{\gamma/10} = \frac{P_{DCH\_LIN}}{P_{ACK\_LIN}}$$

thus:

$$P_{DCH} = 10\log_{10}\left[\frac{P_{MAX\_LIN} - P_{RLCC\_LIN}}{1 + 10^{-\gamma/10}}\right]$$

Equating the above equations results in:

$$RDCHGain = \qquad\qquad\text{Equation 30}$$

$$\min\left\{\begin{bmatrix} 10\log_{10}\left[\frac{P_{MAX\_LIN} - P_{RLCC\_LIN}}{1 + 10^{-\gamma/10}}\right] - DataCtrlOffset - 10\log_{10} N_C + \\ 10\log_{10}[N_{CTRL-SUBCARRIERS}] - P_{CTRL} \\ RDCHGainMax \end{bmatrix}\right\}$$

In one example of a RDCHGainNONRLCC Computation, the RDCHGain$_{NonRLCC}$ parameter is computed only for RL PHYFrames that do no contain RL CDMA control segment. For PHYFrames without CDMA RLCC, the power of the R-DCH can be computed according to the equation:

$$P_{DCH} = P_{CTRL} - 10\log_{10}(N_{CTRL-SUBCARRIERS}) + 10\log_{10}(N_c) + RDCHGain_{NonRLC} + DataCtrlOffset \qquad\text{Equation 31}$$

Following a similar discussion as above, results in:

$$RDCHGain = \qquad\qquad\text{Equation 32}$$

$$\min\left\{\begin{bmatrix} 10\log_{10}\left[\frac{P_{MAX\_LIN}}{1 + 10^{-\gamma/10}}\right] - DataCtrlOffset - 10\log_{10} N_C + \\ 10\log_{10}[N_{CTRL-SUBCARRIERS}] - P_{CTRL} \\ RDCHGainMax \end{bmatrix}\right\}$$

In view of the exemplary systems shown and described above, methodologies that may be implemented in accordance with the disclosed subject matter, will be better appreciated with reference to the following flow charts. While, for purposes of simplicity of explanation, the methodologies are shown and described as a series of blocks, it is to be understood and appreciated that the claimed subject matter is not limited by the number or order of blocks, as some blocks may occur in different orders and/or concurrently with other blocks from what is depicted and described herein. Moreover, not all illustrated blocks may be required to implement the methodologies described hereinafter. It is to be appreciated that the functionality associated with the blocks may be implemented by software, hardware, a combination thereof or any other suitable means (e.g. device, system, process, component). Additionally, it should be further appreciated that the methodologies disclosed hereinafter and throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

Figure 6:
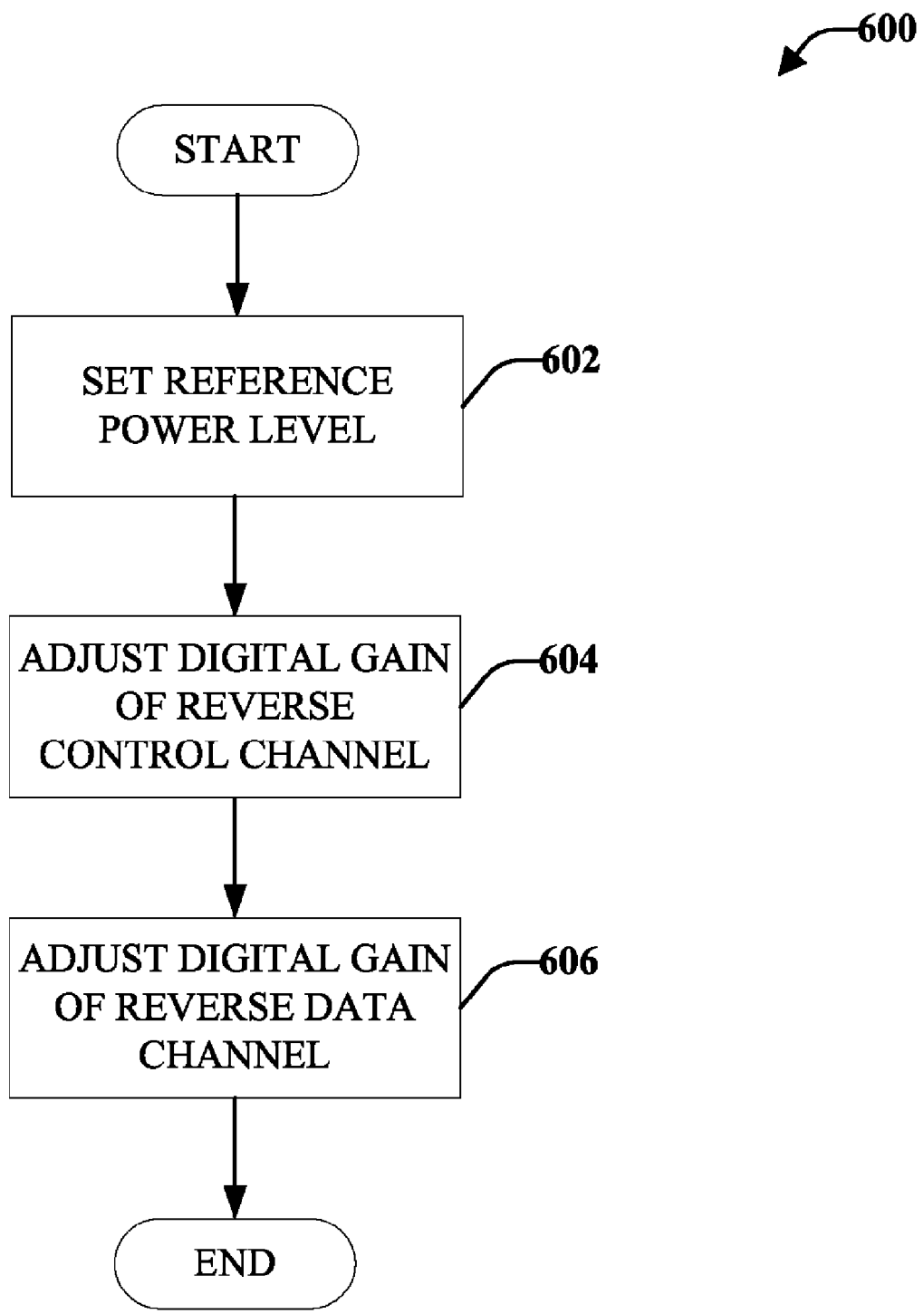
FIG. 6 illustrates a method for power control of multiple modulation waveforms in a wireless communication system.

With reference now to FIG. 6, illustrated is a method 600 for power control of multiple modulation waveforms in a wireless communication system. In accordance with some aspects, method 600 can control channels of multiple modulation waveforms, such as both CDMA channels and OFDMA channels. Method 600 can be utilized from when a mobile device transmits an access probe and is included within wireless communication system until the terminal enters a steady state, or during other times.

Method 600 starts, at 602, when a reference power level is established. The reference power level can be for a reverse link control channel of a first modulation waveform (e.g., CDMA). The power level can be established by utilizing open-loop power control and closed-loop power control. Utilizing the open-loop power control to set the reference power level can include utilizing a difference in mean received power from a reverse link serving sector during successive superframe preamble intervals. There are two manners of utilizing closed-loop power control to set the reference power level: erasure based closed loop power control and UpDown based power control. For erasure based closed loop control, erasure bits received from an access point are utilized to update the reference power level. For UpDown based power control, up-down power control bits received from an access point are utilized to update the reference power level. In accordance with some aspects, setting a reference power level for a reverse link control channel of the first modulation waveform using open-loop power control and closed-loop power control is given by $P_{CTRL}$=ProbePower+CtrlAccessOffset (Equation 7 above). Additionally or alternatively, the reference power level can be updated by adjusting settings of a Power Amplifier, an Analog Front End, and a Digital-to-Analog Converter.

At 604, a digital gain of a reverse link control channel is adjusted as a function of the reference power level. The reverse link control channel can be a reverse link control channel of a second modulation waveform (e.g., OFDMA).

The digital gain of the reverse link control channel can be adjusted by a factor proportional to a reverse link control channel gain. In accordance with some aspects, the digital gain is applied at a modulator block prior to an IFFT stage of a reverse link multiple modulation waveform (e.g., OFDMA-CDMA) transmitter.

At 606, a digital gain of a reverse link data channel is adjusted. The reverse data channel can be a reverse link data channel of the second modulation waveform. The adjustment can be relative to the reference power level, which was set, at 602. In accordance with some aspects, the adjustment can be by a factor proportional to a reverse data channel gain. Additionally or alternatively, the digital gain can be applied at a modulator block prior to an IFFT stage of a reverse link multiple modulation waveform transmitter.

In accordance with some aspects, the digital gains of both the reverse link data channel and the reverse link control channel can be limited to a maximum pre-determined gain. Limiting the digital gains can mitigate generated interference caused to other mobile devices within a wireless communication system. In accordance with other aspects, the digital gains of both the reverse link data channel and the reverse link control channel can be power boosted if a channel of the first modulation waveform is not present in a Reverse Link Transmission Frame.

Further, in accordance with some aspects, method 600 can also include transmitting to an access point an in-band or out-of band message, which can include details on a maximum number of reverse link data-subcarriers that can be transmitted. This maximum number of reverse link data-subcarriers can be a factor of limitations of a Power Amplifier and/or maximum pre-determined gain limitations.

Figure 7:
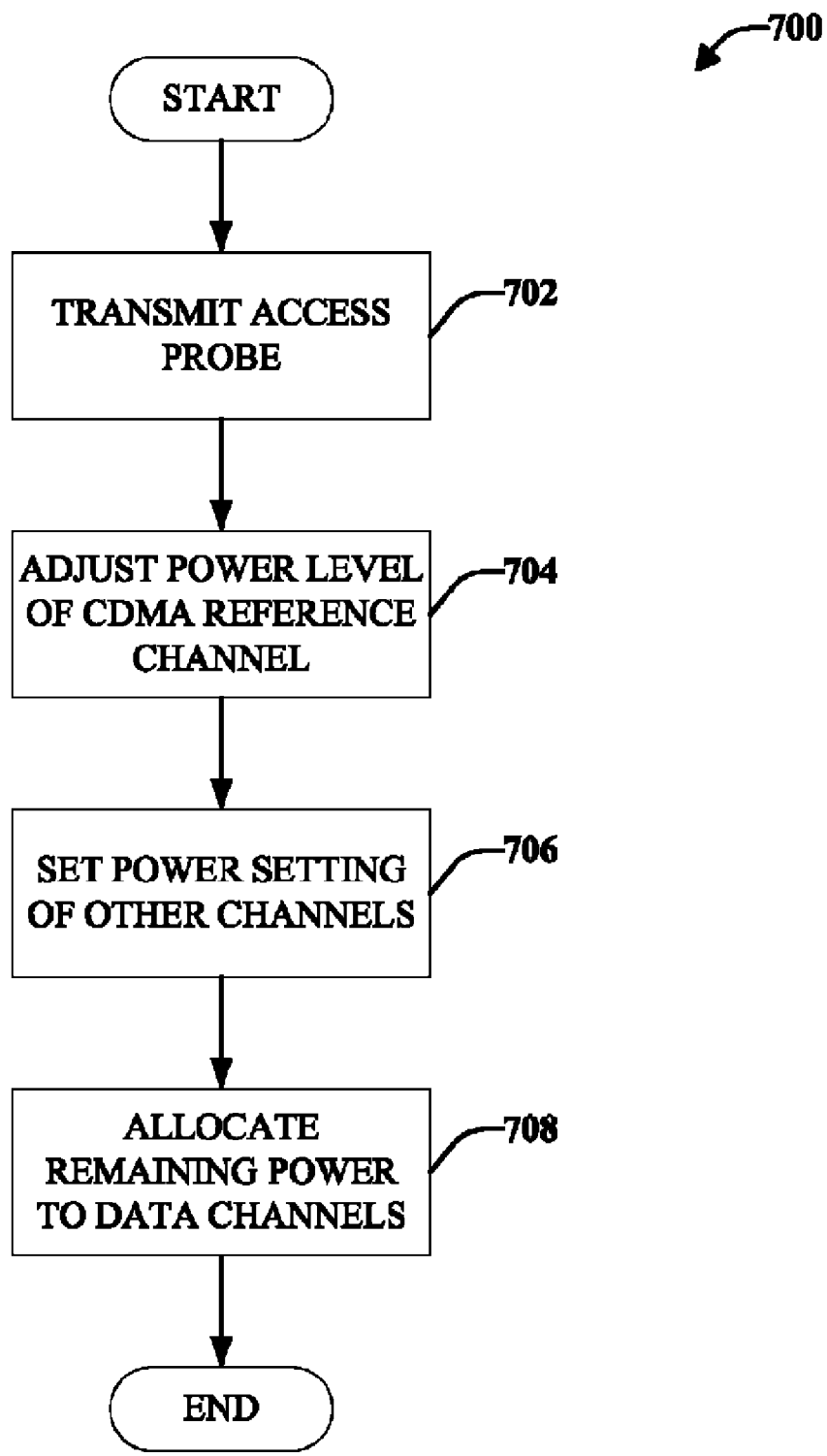
FIG. 7 illustrates another method for power control of multiple modulation waveforms.

FIG. 7 illustrates another method 700 for power control of multiple modulation waveforms. Method 700 starts, at 702, when an access probe is transmitted. The access probe is transmitted when a mobile device desires to transition from an idle state to a connected state. When the access probe is sent, there is only one channel available because the mobile device is not transmitting data. The access probe is transmitted at a probe power that can be proportional to a mean received power measured from the RLSS. Successive access probes can be sent at a higher power level until an Access Grant is received and successfully decoded.

To determine the initial power to be sent in an access probe, the mobile device can receive power from a multitude of sectors. The power from only the sector to which the access probe is to be sent is determined as described above with reference to the mean receive power per antenna per sector and the estimated energy per antenna and with reference to Equation 2 and Equation 3 above. Thus, the mobile device receives a sum total of power from all sectors. The mobile device, therefore, determines the transmitted power per sector, and identifies at least one sector.

At substantially the same time as the Access Grant is successfully decoded, a power level of a reference channel of a first modulation waveform (e.g., CDMA) is adjusted, at 704. After the first modulation waveform reference channel level is adjusted, the power setting of other channels are adjusted relative to the control channel of the first modulation waveform, at 706. This adjustment can be performed digitally, which can be performed by a modulator block. For example, at 706, the digital gains of various channels can be adjusted. These channels include REQ, CQI and ACK control channels. The digital gains of the channels can be adjusted so that these channels are power boosted relative to the first modulation waveform (e.g., CDMA) RL reference power. A digital gain of an R-DCH channel can be adjusted by a factor proportional to RDCHGain. In accordance with some aspects, the tuple is reported in an InBandPowerControl block of a MAC header of an RTC-MAC packet.

At 708, the remaining power is allocated to the data channels. In accordance with some aspects, additional gains of the RDCH are adjusted. After adjusting the RDCH channels, a message that includes the RDDCH gain can be sent to the base station. The (feedback) message advises the base station of the bandwidth that can be supported given the power available at the mobile device. The base station, based on this information, can determine how much power is available at the terminal and how many subcarriers (assignment) should be allocated to the terminal, as well as for other purposes.

The terminal might be moving around or the power the terminal receives might change over time because of the propagation environment (channel) changes, thus, the reference level can be continuously monitored and adjusted over time. Further, the receive power might also change. If the reference level changes, the power amplifier setting is adjusted, which can be an analog setting.

Adjustments might need to be made if the base station, after receiving the channel of the first modulation waveform, determines that the mobile device is transmitting at too high (or too low) a power. If adjustments are necessary, the base station can send a feedback message, which can include a CEI bit transmitted over an appropriate F-SSCH. If the CEI bit received is "1", the mobile device should increase the corresponding $P_{CTRL}$ by PowerControlStepUp dB. If the CEI bit received is "0", the mobile device should decreate the corresponding $P_{CTRL}$ by PowerControlStepDown dB. Thus, the various aspects described herein relate to power control of multiple modulation waveforms in a wireless communication environment.

Figure 8:
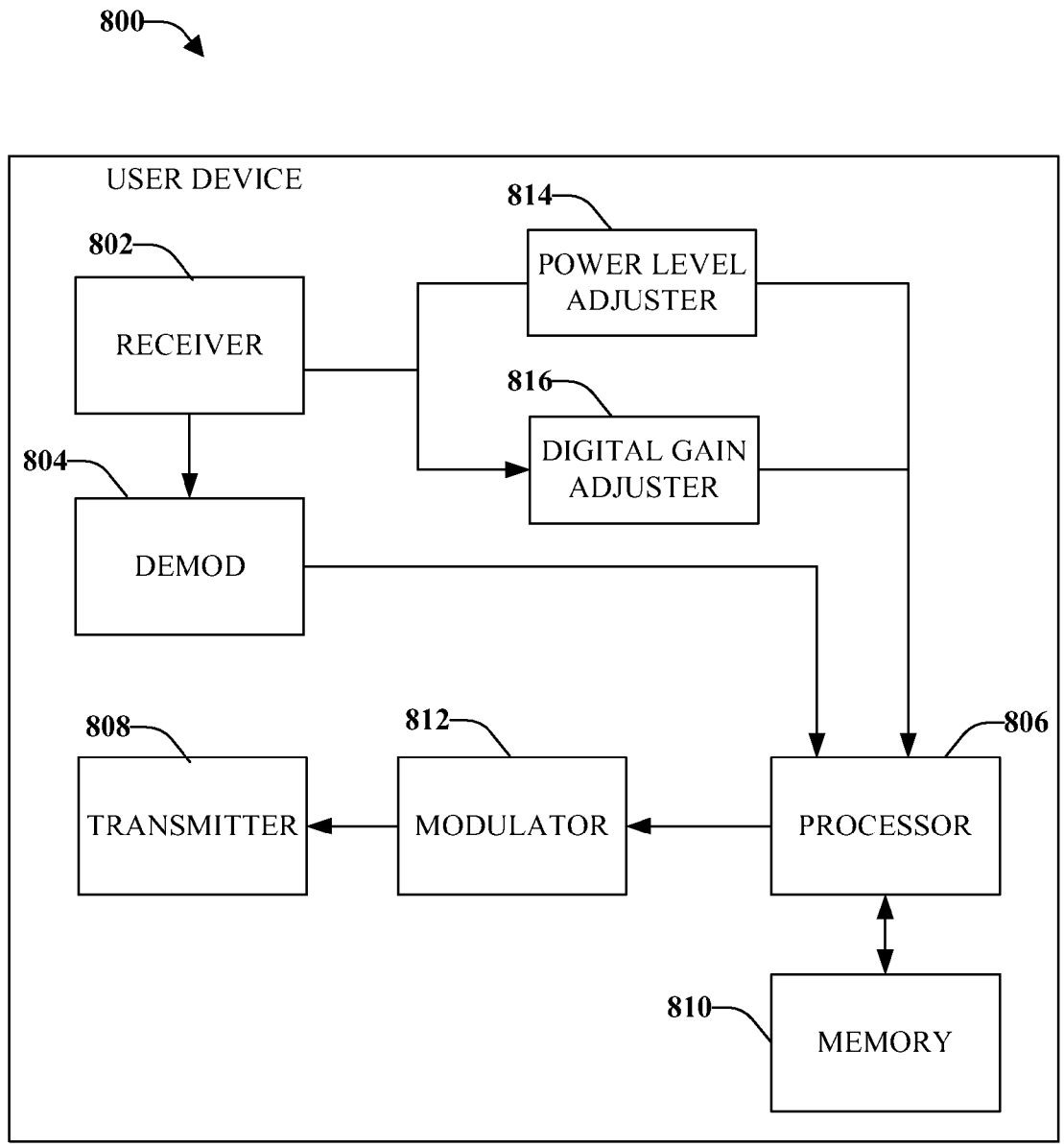
FIG. 8 illustrates a system that facilitates power control for an access terminal in accordance with one or more of the disclosed aspects.

With reference now to FIG. 8, illustrated is a system 800 that facilitates power control for an access terminal in accordance with one or more of the disclosed aspects. System 800 can reside in a user device. System 800 comprises a receiver 802 that can receive a signal from, for example, a receiver antenna. The receiver 802 can perform typical actions thereon, such as filtering, amplifying, downconverting, etc. the received signal. The receiver 802 can also digitize the conditioned signal to obtain samples. A demodulator 804 can obtain received symbols for each symbol period, as well as provide received symbols to a processor 806.

Processor 806 can be a processor dedicated to analyzing information received by receiver component 802 and/or generating information for transmission by a transmitter 808. In addition or alternatively, processor 806 can control one or more components of user device 800, analyze information received by receiver 802, generate information for transmission by transmitter 808, and/or control one or more components of user device 800. Processor 806 may include a controller component capable of coordinating communications with additional user devices.

User device 800 can additionally comprise memory 808 operatively coupled to processor 806 and that can store information related to power control adjustment, coordinating communications and any other suitable information. Memory 810 can additionally store protocols associated with power control. It will be appreciated that the data store (e.g., memories) components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 808 of the subject systems and/or methods is intended to comprise, without being limited to, these and any other suitable types of memory. User device 800 can further comprise a symbol modulator 812 and a transmitter 808 that transmits the modulated signal.

Receiver 802 is further operatively coupled to a power level adjuster 814 that sets a reference power level for a reverse link control channel of a first modulation waveform using open-loop power control and closed-loop power control. Additionally, receiver 802 can be operatively coupled to a digital gain adjuster 816 that sets a digital gain of a reverse link control channel of a second modulation waveform and/or a reverse link data channel of the second modulation waveform relative to the reference power level.

Figure 9:
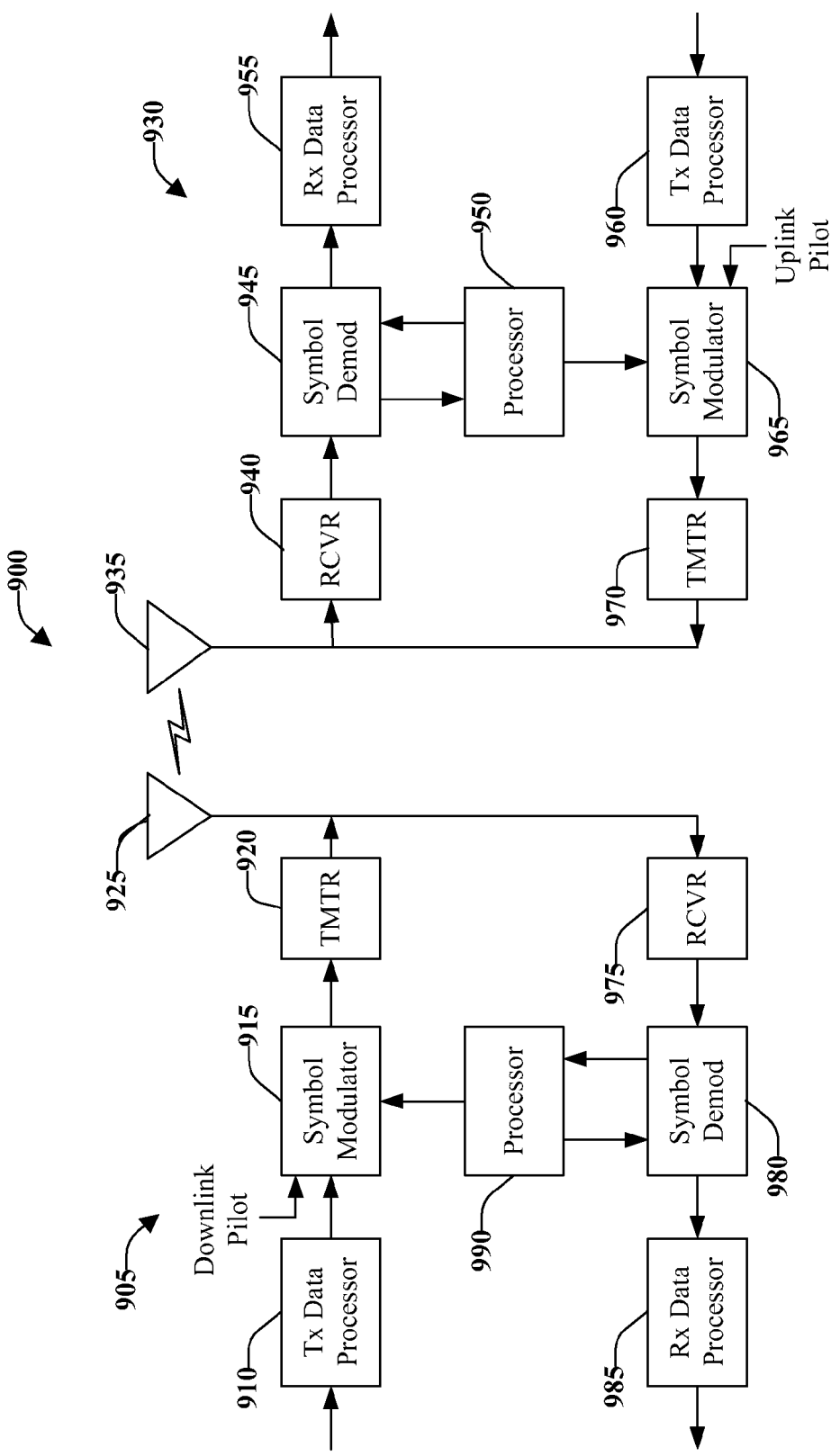
FIG. 9 illustrates an exemplary wireless communication system.

FIG. 9 illustrates an exemplary wireless communication system 900. Wireless communication system 900 depicts one base station and one terminal for sake of brevity. However, it is to be appreciated that system 900 can include more than one base station or access point and/or more than one terminal or user device, wherein additional base stations and/or terminals can be substantially similar or different from the exemplary base station and terminal described below. In addition, it is to be appreciated that the base station and/or the terminal can employ the systems and/or methods described herein to facilitate wireless communication there between.

Referring now to FIG. 9, on a downlink, at access point 905, a transmit (TX) data processor 910 receives, formats, codes, interleaves, and modulates (or symbol maps) traffic data and provides modulation symbols ("data symbols"). A symbol modulator 915 receives and processes the data symbols and pilot symbols and provides a stream of symbols. A symbol modulator 915 multiplexes data and pilot symbols and obtains a set of N transmit symbols. Each transmit symbol may be a data symbol, a pilot symbol, or a signal value of zero. The pilot symbols may be sent continuously in each symbol period. The pilot symbols can be frequency division multiplexed (FDM), orthogonal frequency division multiplexed (OFDM), time division multiplexed (TDM), frequency division multiplexed (FDM), or code division multiplexed (CDM).

A transmitter unit (TMTR) 920 receives and converts the stream of symbols into one or more analog signals and further conditions (e.g., amplifies, filters, and frequency upconverts) the analog signals to generate a downlink signal suitable for transmission over the wireless channel. The downlink signal is then transmitted through an antenna 925 to the terminals. At terminal 930, an antenna 935 receives the downlink signal and provides a received signal to a receiver unit (RCVR) 940. Receiver unit 940 conditions (e.g., filters, amplifies, and frequency downconverts) the received signal and digitizes the conditioned signal to obtain samples. A symbol demodulator 945 obtains N received symbols and provides received pilot symbols to a processor 950 for channel estimation. Symbol demodulator 945 further receives a frequency response estimate for the downlink from processor 950, performs data demodulation on the received data symbols to obtain data symbol estimates (which are estimates of the transmitted data symbols), and provides the data symbol estimates to an RX data processor 955, which demodulates (i.e., symbol demaps), deinterleaves, and decodes the data symbol estimates to recover the transmitted traffic data. The processing by symbol demodulator 945 and RX data processor 955 is complementary to the processing by symbol modulator 915 and TX data processor 910, respectively, at access point 905.

On the uplink, a TX data processor 960 processes traffic data and provides data symbols. A symbol modulator 965 receives and multiplexes the data symbols with pilot symbols, performs modulation, and provides a stream of symbols. A transmitter unit 970 then receives and processes the stream of symbols to generate an uplink signal, which is transmitted by the antenna 935 to the access point 905.

At access point 905, the uplink signal from terminal 930 is received by the antenna 925 and processed by a receiver unit 975 to obtain samples. A symbol demodulator 980 then processes the samples and provides received pilot symbols and data symbol estimates for the uplink. An RX data processor 985 processes the data symbol estimates to recover the traffic data transmitted by terminal 930. A processor 990 performs channel estimation for each active terminal transmitting on the uplink.

Processors 990 and 950 direct (e.g., control, coordinate, manage, . . . ) operation at access point 905 and terminal 930, respectively. Respective processors 990 and 950 can be associated with memory units (not shown) that store program codes and data. Processors 990 and 950 can also perform computations to derive frequency and impulse response estimates for the uplink and downlink, respectively.

For a multiple-access system (e.g., FDMA, OFDMA, CDMA, TDMA, and the like), multiple terminals can transmit concurrently on the uplink. For such a system, the pilot subbands may be shared among different terminals. The channel estimation techniques may be used in cases where the pilot subbands for each terminal span the entire operating band (possibly except for the band edges). Such a pilot subband structure would be desirable to obtain frequency diversity for each terminal. The techniques described herein may be implemented by various means. For example, these techniques may be implemented in hardware, software, or a combination thereof. For a hardware implementation, the processing units used for channel estimation may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes may be stored in memory unit and executed by the processors 990 and 950.

Figure 10:
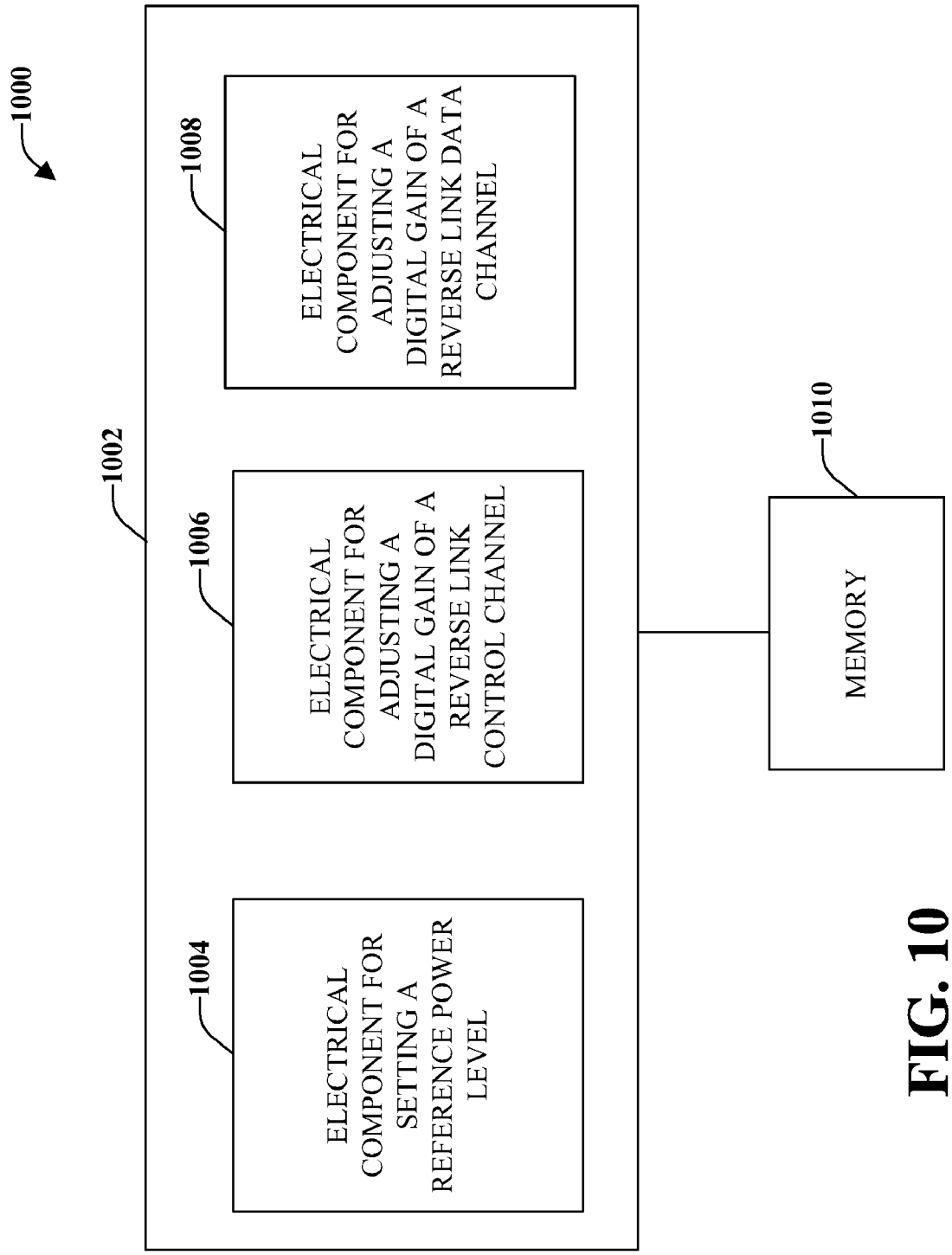
FIG. 10 illustrates an example system that controls power for channels that utilize different modulation waveforms.

With reference to FIG. 10, illustrated is an example system 1000 that controls power for channels that utilize different modulation waveforms. For example, system 1000 may reside at least partially within a mobile device. It is to be appreciated that system 100 is represented as including functional blocks, which may be functional blocks that represent functions implemented by a processor, software, or combination thereof (e.g., firmware).

System 1000 includes a logical grouping 1002 of electrical components that can act separately or in conjunction. For instance, logical grouping 1002 may include an electrical component for setting a reference power level 1204. Pursuant to an illustration, the reference power level is for a reverse link control channel of a first modulation waveform (e.g., CDMA). The reference power level can be set using open-loop power control and closed-loop power control. Closed-loop power control can include erasure based closed loop power-control and/or UpDown based closed-loop power control. Open-loop power control can comprise utilizing a difference in mean received power from a reverse link serving sector during successive superframe preamble intervals. In accordance with some aspects, setting the reference power level using open-loop power control and closed-loop power control is given by $P_{CTRL}$=ProbePower+CtrlAccessOffset. In accordance with some aspects, the reference power level can be updated by adjusting settings of a Power Amplifier, an Analog Front End, and a Digital-to-Analog Converter.

Logical grouping 1002 can also include an electrical component for adjusting a digital gain of a reverse link control channel of a second modulation waveform (e.g., OFDMA) as a function of the reference power level 1006. The digital gain of the reverse link control channel of the second modulation waveform can be adjusted by a factor proportional to a reverse link control channel gain.

Further, logical grouping 1002 can comprise an electrical component for adjusting a digital gain of a reverse link data channel of the second modulation waveform 1008. For example, the digital gain can be adjusted relative to the reference power level. In accordance with some aspects, the digital gain of the reverse link data channel of the second modulation waveform can be adjusted by a factor proportional to a reverse link data channel gain.

In accordance with some aspects, the digital gain of the reverse link data channel of the second modulation waveform and the digital gain of the reverse link control channel of the second modulation waveform are power boosted if a channel of the first modulation waveform is not present in a Reverse Link Transmission Frame. In accordance with some aspects, the digital gain of the reverse link data channel of the second modulation waveform and the digital gain of the reverse link control channel of the second modulation waveform are limited to a maximum pre-determined gain to mitigate the amount of interference generated.

Additionally or alternatively, logical grouping can include a means from transmitting an in-band or out-of band message (not shown). The in-band or out-of bank message can include details on a maximum number of reverse link data-subcarriers that can be transmitted. The maximum number of reverse link data-subcarriers can be subject to Power Amplifier limitations and maximum pre-determined gain limitations.

Additionally, system 1000 can include a memory 1010 that retains instructions for executing functions associated with electrical components 1004, 1006, and 1008 or other components. While shown as being external to memory 1010, it is to be understood that one or more of electrical components 1004, 1006, and 1008 may exist within memory 1010.

It is to be understood that the embodiments described herein may be implemented by hardware, software, firmware, middleware, microcode, or any combination thereof. When the systems and/or methods are implemented in software, firmware, middleware or microcode, program code or code segments, they may be stored in a machine-readable medium, such as a storage component. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, etc.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor through various means as is known in the art. Further, at least one processor may include one or more modules operable to perform the functions described herein.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product may include a computer readable medium having one or more instructions or codes operable to cause a computer to perform the functions described herein.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within scope of the appended claims. To the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description of the claims is meant to be a "non-exclusive or".

What is claimed is:

1. A method for providing power control for at least two modulation waveforms used in a wireless communication system, comprising:
    setting a reference power level for a reverse link control channel of a first modulation waveform using open-loop power control and closed-loop power control;
    adjusting a digital gain of a reverse link control channel of a second modulation waveform relative to the reference power level; and
    adjusting a digital gain of a reverse link data channel of the second modulation waveform relative to the reference power level.

2. The method of claim 1, wherein setting the reference power level for the reverse link control channel of the first modulation waveform using open-loop power control, comprises:
    utilizing a difference in mean received power from a reverse link serving sector during successive superframe preamble intervals.

3. The method of claim 1, wherein setting the reference power level for the reverse link control channel of the first modulation waveform using closed-loop power control, comprises:
    utilizing erasure bits received from an access point to update the reference power level.

4. The method of claim 1, wherein setting the reference power level for the reverse link control channel of the first modulation waveform using closed-loop power control, comprising:
    utilizing up-down power control bits received from an access point to update the reference power level.

5. The method of claim 1, wherein setting the reference power level for the reverse link control channel of the first modulation waveform using open-loop power control and closed-loop power control is given by $P_{CTRL}$=ProbePower+CtrlAccessOffset.

6. The method of claim 1, wherein the digital gain of the reverse link data channel of the second modulation waveform is adjusted by a factor proportional to a reverse link data channel gain.

7. The method of claim 6, wherein the digital gain of the reverse link data channel of the second modulation waveform is applied at a modulator block prior to an IFFT stage of a reverse link multiple modulation waveform transmitter.

8. The method of claim 1, wherein the digital gain of the reverse link control channel of the second modulation waveform is adjusted by a factor proportional to a reverse link control channel gain.

9. The method of claim 8, wherein the digital gain of the reverse link control channel of the second modulation waveform is applied at a modulator block prior to an IFFT stage of a reverse link multiple modulation waveform transmitter.

10. The method of claim 1, wherein the reference power level is updated by adjusting settings of a Power Amplifier, an Analog Front End, and a Digital-to-Analog Converter.

11. The method of claim 1, wherein the digital gain of the reverse link data channel of the second modulation waveform and the digital gain of the reverse link control channel of the second modulation waveform are power boosted if the reverse link control channel of the first modulation waveform is not present in a Reverse Link Transmission Frame.

12. The method of claim 1, wherein the digital gain of the reverse link data channel of the second modulation waveform and the digital gain of the reverse link control channel of the second modulation waveform are limited to a maximum pre-determined gain to mitigate generated interference within the wireless communication system.

13. The method of claim 1, further comprising:
    transmitting an in-band or out-of band message that includes details on a maximum number of reverse link data-subcarriers that can be transmitted, wherein the maximum number of reverse link data-subcarriers is subject to Power Amplifier limitations and maximum pre-determined gain limitations.

14. A wireless communications apparatus, comprising:
    a memory that retains instructions related to setting a reference power level for a reverse link control channel of a first modulation waveform using open-loop power control and closed-loop power control, adjusting a digital gain of a reverse link control channel of a second modulation waveform as a function of the reference power level, and adjusting a digital gain of a reverse link data channel of the second modulation waveform as a function of the reference power level; and
    a processor, coupled to the memory, configured to execute the instructions retained in the memory.

15. The wireless communications apparatus of claim 14, the memory further retains instructions relating to utilizing a difference in mean received power from a reverse link serving sector during successive superframe preamble intervals.

16. The wireless communications apparatus of claim 14, the memory further retains instructions relating to utilizing erasure bits received from an access point to update the reference power level.

17. The wireless communications apparatus of claim 14, the memory further retains instructions relating to utilizing up-down power control bits received from an access point to update the reference power level.

18. The wireless communications apparatus of claim 14, wherein setting a reference power level for a reverse link control channel of the first modulation waveform using open-loop power control and closed-loop power control is given by $P_{CTRL}$=ProbePower+CtrlAccessOffset.

19. The wireless communications apparatus of claim 14, wherein the digital gain of the reverse link data channel of the second modulation waveform is adjusted by a factor proportional to a reverse link data channel gain.

20. The wireless communications apparatus of claim 19, wherein the digital gain of the reverse link data channel of the second modulation waveform is applied at a modulator block before an IFFT stage of a reverse link multi-modulation waveform transmitter.

21. The wireless communications apparatus of claim 14, wherein the digital gain of the reverse link control channel of the second modulation waveform is adjusted by a factor proportional to a reverse link control channel gain.

22. The wireless communications apparatus of claim 21, wherein the digital gain of the reverse link control channel of the second modulation waveform is applied at a modulator block before an IFFT stage of a reverse link multiple modulation waveform transmitter.

23. The wireless communications apparatus of claim 14, wherein the reference power level is updated by adjusting settings of a Power Amplifier, an Analog Front End, and a Digital-to-Analog Converter.

24. The wireless communications apparatus of claim 14, wherein the digital gain of the reverse link data channel of the second modulation waveform and the digital gain of the reverse link control channel of the second modulation waveform are power boosted if the reverse link control channel of the first modulation waveform channel is not present in a Reverse Link Transmission Frame.

25. The wireless communications apparatus of claim 14, wherein the digital gain of the reverse link data channel of the second modulation waveform and the digital gain of the reverse link control channel of the second modulation waveform are limited to a maximum pre-determined gain to mitigate generated interference within the wireless communication system.

26. The wireless communications apparatus of claim 14, the memory further retaining instructions relating to transmitting an in-band or out-of band message that includes details on a maximum number of reverse link data-subcarriers that can be transmitted, wherein the maximum number of reverse link data-subcarriers is subject to Power Amplifier limitations and maximum pre-determined gain limitations.

27. A wireless communications apparatus that facilitates power control, comprising:
    means for setting a reference power level for a reverse link control channel of a first modulation waveform using open-loop power control and closed-loop power control;
    means for adjusting a digital gain of a reverse link control channel of a second modulation waveform relative to the reference power level; and
    means for changing a digital gain of a reverse link data channel of the second modulation waveform relative to the reference power level.

28. The wireless communications apparatus of claim 27, further comprising:
    means for using a difference in mean received power from a reverse link serving sector during successive superframe preamble intervals.

29. The wireless communications apparatus of claim 27, further comprising:
    means for using erasure bits received from an access point to update the reference power level.

30. The wireless communications apparatus of claim 27, further comprising:
    means for utilizing up-down power control bits received from an access point to update the reference power level.

31. The wireless communications apparatus of claim 27, wherein the means for setting a reference power level for a reverse link control channel of the first modulation waveform using open-loop power control and closed-loop power control is given by $P_{CTRL}$=ProbePower+CtrlAccessOffset.

32. The wireless communications apparatus of claim 27, wherein the digital gain of the reverse link data channel of the second modulation waveform is adjusted by a factor proportional to a reverse link data channel gain.

33. The wireless communications apparatus of claim 27, wherein the digital gain of the reverse link control channel of the second modulation waveform is adjusted by a factor proportional to a reverse link control channel gain.

34. A non-transitory machine-readable medium having stored thereon machine-executable instructions for:
    transmitting an access probe;
    determining a receive power from a single sector;
    setting a reference power of a reverse link control channel of a first modulation waveform;
    changing a digital gain of a reverse link control channel of a second modulation waveform as a function of the reference power; and
    changing a digital gain of a reverse link data channel of the second modulation waveform as a function of the reference power.

35. The non-transitory machine-readable medium of claim 34, the instructions further comprising:
    monitoring the reference power;
    determining if the reference power is different; and
    changing a power amplifier setting if the reference power is different.

36. The non-transitory machine-readable medium of claim 34, the instructions further comprising using at least one of an erasure based closed loop power-control or UpDown based closed-loop power control to set the reference power of the reverse link control channel of the first modulation waveform.

37. In a wireless communications system, an apparatus comprising:
    a processor configured to:
    set a reference power level for a reverse link control channel of a first modulation waveform using open-loop power control and closed-loop power control;
    adjust a digital gain of a reverse link control channel of a second modulation waveform relative to the reference power level; and
    adjust a digital gain of a reverse link data channel of the second modulation waveform relative to the reference power level.

* * * * *